(12) United States Patent
Matsuo et al.

(10) Patent No.: US 7,439,353 B2
(45) Date of Patent: *Oct. 21, 2008

(54) PROCESS FOR MANUFACTURING CELLULOSE MOLDING, PLANT COMPONENT EXTRACTING APPARATUS, AND PROCESS FOR PRODUCING CELLULOSE ACETATE

(75) Inventors: Shunichi Matsuo, Tokyo (JP); Takatsugu Takamura, Ageo (JP)

(73) Assignee: Celjan Co., Ltd., Tokyo (JP)

( * ) Notice: Subject to any disclaimer, the term of this patent is extended or adjusted under 35 U.S.C. 154(b) by 663 days.

This patent is subject to a terminal disclaimer.

(21) Appl. No.: 10/799,924

(22) Filed: Mar. 12, 2004

(65) Prior Publication Data

US 2004/0241302 A1 Dec. 2, 2004

(30) Foreign Application Priority Data

Mar. 25, 2003 (JP) .................... 2003-082508
Mar. 25, 2003 (JP) .................... 2003-082509
Mar. 31, 2003 (JP) .................... 2003-094721

(51) Int. Cl.
*C07H 1/06* (2006.01)
*C07H 1/08* (2006.01)
*C08B 3/06* (2006.01)

(52) U.S. Cl. ........................ 536/128; 536/69

(58) Field of Classification Search ............ 536/69, 536/124

See application file for complete search history.

(56) References Cited

U.S. PATENT DOCUMENTS

| 5,244,945 A | * | 9/1993 | Elion | 524/10 |
| 5,371,207 A | * | 12/1994 | Zhuang | 536/58 |
| 6,228,213 B1 | * | 5/2001 | Hanna et al. | 162/18 |
| 6,984,731 B2 | * | 1/2006 | Matsuo et al. | 536/69 |

OTHER PUBLICATIONS http://cs.ffpri.affrc.go.jp/fbd/kenmori/mori-26.html, "Comprehensive Utilization and Economical Efficiency of Wood Components Based on Digesting/Explosive-Crushing Treatment" (retrieved Mar. 13, 2003) Forestry and Forest Products Research, Wood Chemical Engineering Section. (Japanese original plus translation).

* cited by examiner

*Primary Examiner*—Shaojia Anna Jiang
*Assistant Examiner*—Layla Bland
(74) *Attorney, Agent, or Firm*—Knobbe Martens Olson & Bear LLP

(57) ABSTRACT

This invention relates to a process of manufacturing a cellulose molding, a plant component extracting apparatus and a process of manufacturing cellulose acetate. In one embodiment of the invention, the process of manufacturing a cellulose molding comprises steaming corncob meal at a temperature of 150 to 250° C. and a pressure of 20 to 29 MPa, filtering the steamed corncob meal with a filtering device to obtain a solid and molding the solid.

4 Claims, 13 Drawing Sheets

F I G . 8
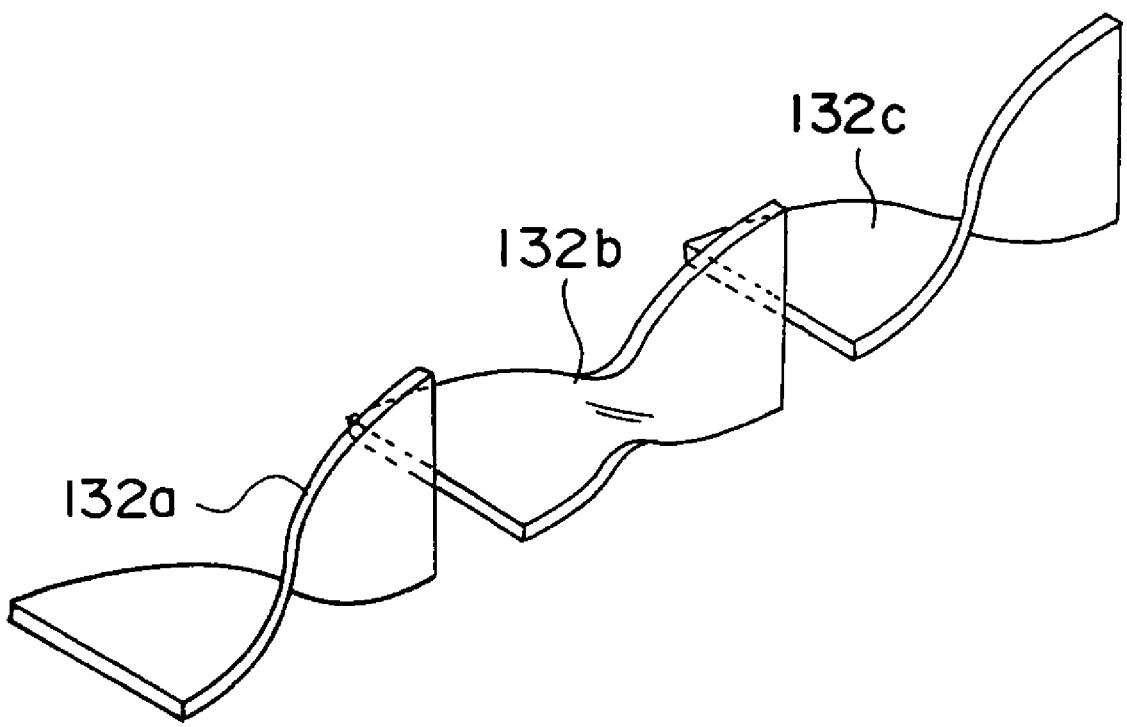

PROCESS FOR MANUFACTURING CELLULOSE MOLDING, PLANT COMPONENT EXTRACTING APPARATUS, AND PROCESS FOR PRODUCING CELLULOSE ACETATE

CROSS-REFERENCE TO RELATED APPLICATION

This application claims priority under 35 U S C 119 from Japanese Patent Application Nos. 2003-82508, 2003-82509, and 2003-94721, the disclosures of which are incorporated by reference herein.

BACKGROUND OF THE INVENTION

1. Field of the Invention

The present invention relates to a process for manufacturing a cellulose molding which is biodegradable and made from corncob meal; a plant component extracting apparatus which extracts a useful component such as cellulose from a plant, and in particularly, which can simply extract and separate a useful component without requiring a process of decomposing lignin with an agent; and a process for manufacturing cellulose acetate which is useful as a biodegradable plastic and made from bagasse, kenaf, reeds or rice straw.

2. Description of the Related Art

Biodegradable plastic is a plastic, which, like any ordinary plastic, exhibits excellent functions when in use, but which is quickly decomposed by microorganisms in a natural environment (for example, in the soil) after use and eventually becomes an organic component of earth, water and carbon dioxide, and is drawing attention in connection with the current problem of waste and the like.

Various kinds of biodegradable plastic products have been made public. Examples of such products include polylactic acids produced by dehydration and polymerization from lactic acid obtained by fermenting starch of corn, potatoes, and the like with lactobacilli. Such products are used for an agricultural multi-film, a compost bag, and the like. However, prices of raw materials and processing costs for the products are high, and these products are not necessarily rational in consideration of foodstuff situations in the future.

Although polycaprolactone, which is another example of a biodegradable plastic, may be satisfactory in physical properties as a plastic and biodegradability, polycaprolactone is also so expensive that it is difficult to use as an agricultural material and the like, and use thereof is limited to medical materials and the like.

Moreover, a plastic obtained merely by kneading corn starch with polyethylene is being sold as a biodegradable plastic. This plastic, however, is not a biodegradable plastic in the true sense of the word, since it has become clear that, although its components, which are derived from natural matter, such as starch, may be biodegradable, polyethylene does not undergo any change (decomposition). Accordingly such products are being driven out of the market despite their low price.

Thus, spreading of the biodegradable plastics, which have been heretofore known, has been slow because of their unsatisfactory performance, or because they require a complicated process for manufacture and their prices are high. The demand for biodegradable plastic products is, however, expected to increase more and more in the future for protection of the global environment, and accordingly, there is a desire for the development of products having higher performance and lower costs.

Under these circumstances, studies are being performed for a biodegradable plastic composed mainly of cellulose, which plants contain in large quantities, or a derivative thereof. However, a high cost of manufacture of this biodegradable plastic is a problem, as is the case with other biodegradable plastics.

Corncob meal, which is obtained by drying and crushing corncobs, is used as a fungal bed for growing mushrooms, an abrasive for pulse, a nest building material for animals, and the like, but is used very little as an industrial material. The greater part of the corncobs produced is thrown away as waste. Incineration is a main method for waste disposal, and thus, there are many problems with waste disposal including degradation of the environment. Study is, therefore, under way for the effective use of corncobs.

As described above, corncobs are thrown away as waste. However, the majority of a corncob is composed of cellulose (lignocellulose and hemicellulose). When corncobs are used as a raw material for manufacturing a biodegradable plastic consisting mainly of cellulose or a derivative thereof, the cost of the raw material is zero, as hardly any labor is required for gathering the raw material, and costs that have hitherto been borne by agricultural producers for waste disposal are no longer incurred. Accordingly, a biodegradable plastic made from corncobs is considered to be highly price-competitive, compared to other biodegradable plastics.

However, despite having the features mentioned, there has not been developed any bioderadable plastic consisting mainly of cellulose or a derivative thereof made from corncobs. A possible reason for this is a high cost of esterification or the like since it is difficult to separate lignin from lignocellulose, of which corncobs mainly consist.

In order to manufacture a biodegradable plastic consisting mainly of cellulose or a derivative thereof, separation of lignin from lignocellulose is required for obtaining cellulose (pulp of high quality), as described in "Overall Use and Economical Efficiency of Wood Component Obtained by Steaming Treatment and Blasting and Crushing Treatment" (on-line), Forestry and Forest Products Research Institute, Wood Chemical Engineering Section (retrieved on Mar. 13, 2003), the Internet <URL: http://cs.ffpri.affrc.go.jp/fbd/kenmori/mori-26.html and http://cs.ffpri.affrc.go.jp/fdb/kenmori/mori/mori-26.html>. However, the separation of lignin from lignocellulose requires many steps, i.e., grinding corncobs in a stone mill, boiling with alkali and applying a sulfurous acid treatment.

In addition to corncobs, plant seeds such as sunflower seeds, bagasse which is cane trash, kenaf, reeds, and rice straw are also promising plant raw materials for manufacturing cellulose of high quality.

Namely, agro-industrial waste, such as rice straw and bagasse which is cane trash obtained after sugar cane is squeezed to extract juice therefrom, is used very little as an industrial material, and the majority of such waste is thrown away. Incineration is a main method for waste disposal, and thus there are many problems with waste disposal including degradation of the environment. Therefore, study is under way for use of such waste.

The majority of bagasse, rice straw, and the like are composed of cellulose (lignocellulose and hemicellulose). Thus, when they are used as a raw material for manufacturing a biodegradable plastic consisting mainly of cellulose or a derivative thereof, as in the above case, the cost of the raw material is zero, as hardly any labor is required for gathering the raw material, and costs that have hitherto been borne by agricultural producers for waste disposal are no longer incurred. Accordingly, a biodegradable plastic made from bagasse, rice straw, or the like is considered to be highly price-competitive, compared to other biodegradable plastics.

Further the majority of reeds growing on the waterfront and kenaf, which is a fibrous plant, is also composed of cellulose. Therefore, when they are used as a raw material for manufacturing a biodegradable plastic consisting mainly of cellulose or a derivative thereof, it is possible to provide a biodegradable plastic which is expected to be highly price-competitive.

However, despite having the features mentioned, there has not been developed any bioderadable plastic consisting mainly of cellulose or a derivative thereof made from the aforementioned bagasse, kenaf, reeds or rice straw (which may collectively be referred to below as "bagasse or the like"). A possible reason for this is, as in the above case, a high cost of esterification or the like since it is difficult to separate lignin from lignocellulose, of which bagasse or the like mainly consists.

In order to manufacture from bagasse or the like a biodegradable plastic consisting mainly of cellulose or a derivative thereof, separation of lignin from lignocellulose is required for obtaining cellulose (pulp of high quality). However, the separation of lignin from lignocellulose requires many steps, i.e., grinding bagasse or the like in a stone mill, boiling with alkali and applying a sulfurous acid treatment.

Further, as described above, a steaming method and an extraction method with a solvent have conventionally been used as methods for extracting a useful component, such as cellulose, from a plant. However, as described above, these methods are inadequate as an extraction method used to separate and purify cellulose, in view of substantial time and labor for the separation of lignin which requires many steps and the use of an agent such as sodium sulfide, and high cost required for the separation.

SUMMARY OF THE INVENTION

A first object of the present invention is to provide a process for manufacturing a cellulose molding, which process can obtain a biodegradable cellulose molding in a simple and inexpensive manner by using, as a raw material, corncob meal which has hitherto been thrown away.

A second object of the present invention is to provide a plant component extracting apparatus which can separate and extract, in a simple, continuous and rapid manner, a plant component such as cellulose, which is a main component of a biodegradable plastic, without using an agent or using many steps.

A third object of the present invention is to provide a process for manufacturing cellulose acetate which is useful for producing a biodegradable plastic at a low cost, by using bagasse, kenaf, reeds or rice straw as a raw material.

A first aspect of the present invention is a process for manufacturing a cellulose molding, the process comprising:

steaming corncob meal at a temperature of 150 to 250° C. and a pressure of 20 to 29 MPa;

filtering the steamed corncob meal with a filtering device to obtain a solid; and molding the solid.

A second aspect of the present invention is a plant component extracting apparatus comprising:

raw material processing means including a raw material supply portion for supplying a plant raw material and a raw material pressurizing portion for heating and pressurizing the supplied plant raw material at 150 to 350° C. and 5 to 30 MPa, respectively;

hot water supply means including a pressurizer and a heater and supplying sub-critical water having a temperature of 300 to 350° C. pressurized at a pressure of 28 to 30 MPa; and hot water reacting means for carrying out a steaming treatment by mixing the heated and pressurized plant raw material with the sub-critical water supplied from the hot water supply means.

A third aspect of the present invention is a process for a process for manufacturing cellulose acetate, the process comprising:

steaming a material selected from bagasse, kenaf, reeds and rice straw in a pressure vessel at a temperature of 150 to 350° C. and a pressure of 15 to 29 MPa;

filtering the steamed material with a filtering device to obtain a solid; and dehydrating and acetylating the solid by adding acetic anhydride and sulfuric acid to the solid

BRIEF DESCRIPTION OF THE DRAWINGS

FIG. 8 is a perspective view showing an exemplary structure of stators (moving vanes) in the hot water reactor and a cooler.

DETAILED DESCRIPTION OF THE INVENTION

Process for Manufacturing Cellulose Molding

A process for manufacturing a cellulose molding according to a first embodiment of the present invention comprises steaming corncob meal in a pressure vessel at a temperature of 150 to 250° C. and a pressure of 20 to 29 MPa (which may hereinafter be referred to as the "steaming treatment according to the first embodiment"), filtering the steamed corncob meal to obtain a solid product, and molding the solid product.

The steaming treatment according to the first embodiment will be described first.

The steaming treatment according to the first embodiment is a process of adding water to corncob meal (a powder obtained by drying and crushing corncobs) and steaming the mixture in a pressure vessel at 150 to 250° C. and 20 to 29 MPa, which define the conditions for the sub-critical state (immediately before the supercritical state). In the present invention, the steaming treatment enables the separation of lignin from lignocellulose, which has hitherto required many steps.

The steaming treatment according to the first embodiment requires a temperature of 150 to 250° C. and a pressure of 20 to 29 MPa, and preferably a temperature of 180 to 200° C. and a pressure of 25 to 28 MPa.

The amount of water added is preferably 10 to 1000 parts by mass and more preferably 50 to 100 parts by mass, relative to 100 parts by mass of corncob meal.

The steaming treatment according to the first embodiment is preferably carried out for 10 to 30 minutes, and more preferably for 15 to 20 minutes.

Moreover, in the steaming treatment of the first embodiment, a sulfurous acid compound and water may be added to the corncob meal. The addition of the sulfurous acid compound to the corncob meal makes it possible to shorten the time for the steaming treatment. Examples of the sulfurous acid compound include sodium or calcium sulfite.

The amount of the sulfurous acid compound added is preferably 1 to 10 parts by mass, and more preferably 2 to 5 parts by mass, for 100 parts by mass of corncob meal.

Figure 1:
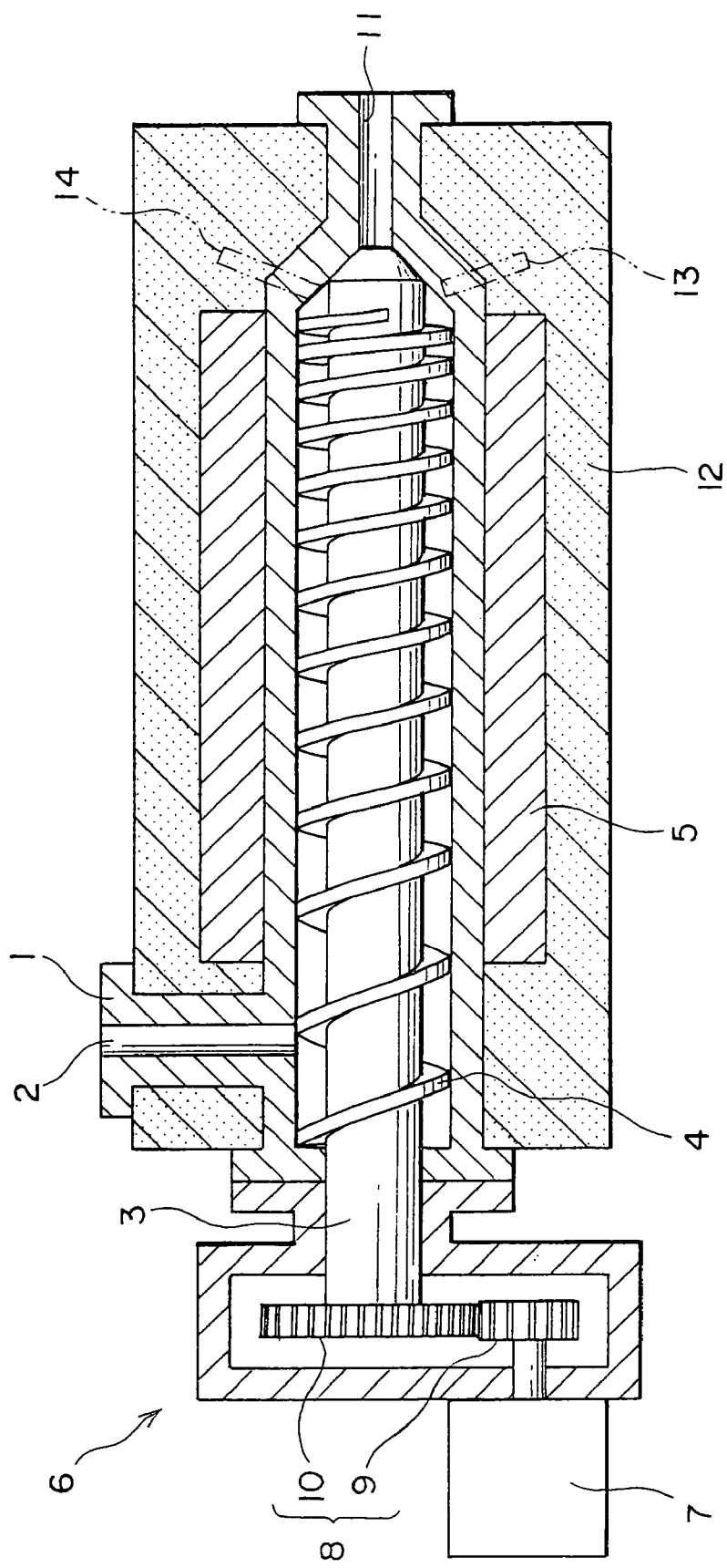
FIG. 1 is a partial sectional view of an extruder having a pressure-sealed cylinder as an example of a pressure vessel for carrying out a steaming treatment according to a first embodiment of the present invention.

The steaming treatment according to the first embodiment is preferably carried out by an extruder having a pressure-sealed cylinder as shown in FIG. 1. FIG. 1 is a partial sectional view of an extruder having a pressure-sealed cylinder, which is an example of a pressure vessel for carrying out the steaming treatment according to the first embodiment. The extruder is composed of: a cylinder 1 having a material input port 2 at its base; a screw 3 having a spiral flight 4 for kneading (steaming) and extruding toward its distal end the corncob meal and water (which may hereinafter be referred to simply as the "materials"), which have been inputted through the material input port 2; a heater 5 for heating the cylinder 1; drive means 6 including a motor 7 connected to a power source (not shown) for rotating the screw 3 and a reduction gear 8 having a prime gear 9 and a driven gear 10; a discharging port 11 for discharging a steamed and extruded product; and a heat insulating material 12 covering the cylinder 1 and the heater 5. A pump (not shown) is connected with the material input port 2 for feeding the materials into the cylinder 1 through the material input port 2. A pitch of the spiral flight 4 of the screw 3 shortens as the spiral flight 4 approaches the discharging port 11. Moreover, the cylinder 1 has a temperature sensor 13 and a pressure sensor 14 installed near the distal end of the screw 3.

The steaming treatment according to the first embodiment is carried out by the extruder, which is shown in FIG. 1, in accordance with the following sequence. The materials are inputted by the unillustrated pump into the cylinder 1 through its material input port 2, and the internal temperature of the cylinder 1 is regulated to a target temperature by the heater 5. As viewed from the motor 7, a rotary shaft of the motor 7 is rotated clockwise to rotate the prime gear 9 clockwise, the driven gear 10 counterclockwise and the screw 3 counterclockwise, thus boiling the corncob meal while extruding the corncob meal toward the discharging port 11. Since the pitch of the spiral flight 4 of the screw 3 shortens toward the discharging port 11, the corncob meal is compressed and subjected to a specific pressure as it approaches the discharging port 11. The corncob meal, for which the steaming treatment has been completed, is extruded through the discharging port 11.

While, in the present embodiment, the temperature sensor 13 and the pressure sensor 14 are installed in the cylinder 1 near the distal end of the screw 3, it is sufficient for an installation position of the temperature sensor 13 to be further toward the distal end side of the screw 3 than a middle portion, with respect to the axial direction, of the cylinder 1. The pressure sensor 14 may be installed in a space that is one fourth of the total length of the screw 3 from the distal end of the screw 3 of the cylinder 1.

When the steaming treatment according to the first embodiment is carried out by the extruder shown in FIG. 1, it is necessary for the temperature and pressure determined by the temperature sensor 13 and the pressure sensor 14 to fall within the range of 150 to 250° C. and 20 to 29 MPa, respectively.

Moreover, it is also suitable to employ a process in which two or more units of extruder shown in FIG. 1 are connected in a series for steaming treatment, i.e., a process in which a mixture of corncob meal and water steamed in a first extruder and extruded through a discharging port 11 thereof is directly inputted into the material input port 2 of a second extruder for further steaming.

When two or more units of extruder shown in FIG. 1 are connected in a series for the steaming treatment according to the first embodiment, the steaming conditions in the extruders may be the same, or differ from one another as long as the steaming conditions for the last connected extruder satisfy the conditions of the temperature of 150 to 250° C. and the pressure of 20 to 29 MPa. In the case in which the steaming conditions differ from one extruder to another, it is preferable for the temperature and pressure to rise from the first extruder to the last connected extruder.

The steaming treatment of the corncob meal according to the first embodiment as described above obtains a mixture of polyphenol (formed by a change from the lignin) and cellulose which are formed by the decomposition of lignocellulose, and soluble hemicellulose (hereinafter referred to as "soluble xylan"). The filtration treatment of the mixture enables it to be separated into cellulose (pulp of high quality) as a solid and a filtrate containing the soluble xylan. The filtrate can be efficiently used as a raw material for xylooligosaccharides.

In the present invention, it is preferable to proceed to a molding step, which will be described later, after the solid is subjected to a treatment such as washing with water or the like, in view of removing impurities from the solid. Further, a first solid which will be described later is washed with water before being subjected to a dehydrating and acetylating treatment to remove alkali therefrom.

The solid obtained by the steaming treatment according to the first embodiment described above is subjected to the molding step, which will be described below, to obtain a cellulose molding.

The molding step in the present invention preferably comprises separating the solid into a first solid and a second solid; dehydrating and acetylating the first solid by adding acetic anhydride and sulfuric acid thereto; filtering the dehydrated and acetylated solid with a filtering device to remove a solid and obtain filtrate; and stirring and mixing the filtrate and the second solid to obtain a liquid product.

A liquid product, which is obtained in the stirring and mixing substep by stirring and mixing liquid cellulose acetate formed by dehydrating and acetylating the first solid (cellulose), and the second solid (cellulose), is molded in the molding step of the present invention including the aforementioned substeps. When the liquid product is molded, cellulose acetate serves as a binder and accelerates solidification of the cellulose, and therefore, a molding can be obtained without using a chemical glue or the like. Further, when a cellulose molding obtained by the present invention is used as a food tray or a lunch container, it is not necessary to coat the molding with a resin such as polyethylene for the purpose of obtaining waterproofing property.

Each of the substeps preferably included in the molding step will be described below.

The separating substep is for separating the solid obtained by the steaming treatment according to the first embodiment into the first and second solids. The first solid is subjected to the dehydrating and acetylating substep, which will be described later, to obtain cellulose acetate.

The ratio of the first solid to the sum of the first and second solids is preferably 5 to 30% by mass, more preferably 8 to 20% by mass, and particularly preferably 10 to 15% by mass. When the ratio is 5 to 30% by mass, it is possible to achieve notable effects of obtaining a molding without using a chemical glue or the like, and of removing a substep of coating a molding with other resin.

The dehydrating and acetylating substep is for subjecting the first solid composed of cellulose to the dehydrating and acetylating treatment.

The first solid (cellulose) is crystallized due to the formation of hydrogen bonds by the hydroxyl groups and is insoluble in both water and any solvent. Therefore, the dehydrating and acetylating treatment is carried out as described below for converting a portion of hydroxyl groups in the molecule to acetate groups to obtain plasticized cellulose acetate, which is soluble in both water and a solvent.

In the present invention, the acetylation degree of the cellulose acetate is preferably 50 to 70%, and more preferably 55 to 60%. When the acetylation degree of the cellulose acetate is 50 to 70%, it is possible to achieve notable effects of obtaining a molding without using a chemical glue or the like, and of removing a substep of coating a molding with other resin.

The dehydrating and acetylating treatment is intended for reacting cellulose with acetic anhydride and sulfuric acid in a pressure vessel equipped with a stirrer to substitute acetate groups for the hydroxyl groups, causing the formation of hydrogen bonds in the cellulose, and is expressed by reaction formulae (1) and (2) below when n is the degree of polymerization and m is the degree of substitution.

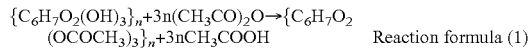

Reaction formula (1)

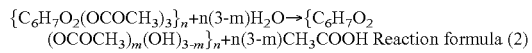

Reaction formula (2)

Reaction formula (1) shows that the reaction of cellulose and acetic anhydride produces cellulose acetate and acetic acid with the complete substitution of acetate groups. On the other hand, reaction formula (2) shows that the reaction of cellulose acetate produced in accordance with reaction formula (1) and water produces cellulose acetate having a degree of substitution m and acetic acid. The acetic acid produced in accordance with reaction formulae (1) and (2) can be reused.

The dehydrating and acetylating treatment can be carried out in accordance with the following sequence.

Sulfuric acid and acetic anhydride are added to and reacted with the first solid (cellulose) obtained by the filtration treatment, and acetic acid is removed (collected) from the resulting reaction product by a dehydrator and is dried. The above procedure obtains cellulose acetate.

The amount of sulfuric acid added is preferably 1 to 10 parts by mass and more preferably 3 to 5 parts by mass relative to 100 parts by mass of dry cellulose. The amount of acetic anhydride added is preferably 1 to 20 parts by mass and more preferably 5 to 10 parts by mass, relative to 100 parts by mass of dry cellulose.

Moreover, acetic acid can be preferably added, and the amount thereof added is preferably 1 to 10 parts by mass and more preferably 3 to 5 parts by mass relative to 100 parts by mass of cellulose.

The dehydration and acetylation treatment is preferably carried out under a pressure of 5 to 15 MPa, and more preferably 8 to 10 MPa. The temperature for the dehydration and acetylation treatment is preferably from 60 to 100° C. and more preferably from 70 to 90° C. The stirring speed for the dehydration and acetylation treatment is preferably from 30 to 100 rpm and more preferably from 40 to 60 rpm. The duration of the dehydration and acetylation treatment is preferably from 15 to 30 hours and more preferably from 20 to 24 hours.

The cellulose acetate obtained by the dehydrating and acetylating treatment is filtered (subjected to the filtration treatment) to separate liquid cellulose acetate from solid cellulose acetate. The liquid cellulose acetate is stirred and mixed with the second solid in the stirring and mixing substep, as will be described later, to obtain a liquid product. The solid cellulose acetate, on the other hand, can be efficiently used as biodegradable plastic.

The stirring and mixing substep is for obtaining a liquid product by stirring and mixing the liquid cellulose obtained by the dehydrating and acetylating treatment, and the second solid. At this time, the second solid is preferably stirred and mixed with the liquid cellulose acetate after being dehydrated.

The stirring and mixing substep is preferably carried out in the following sequence:
(i) The liquid cellulose acetate and the second solid are kneaded by a pulper (an appliance for loosening and dispersing solid pulp) or the like while an appropriate amount of water is added thereto to prepare a pulp liquid.
(ii) The concentration of the pulp liquid is checked, and water is added to the pulp liquid so that the concentration thereof falls within an appropriate range. The concentration of the pulp liquid is preferably 10 to 50% by mass and more preferably 20 to 30% by mass.
(iii) The amount of water in the pulp liquid is adjusted by using a vacuum pump or the like.

While a molding process in the molding step is not particularly limited, direct pressure molding which will be described below is preferable.

Figure 2:
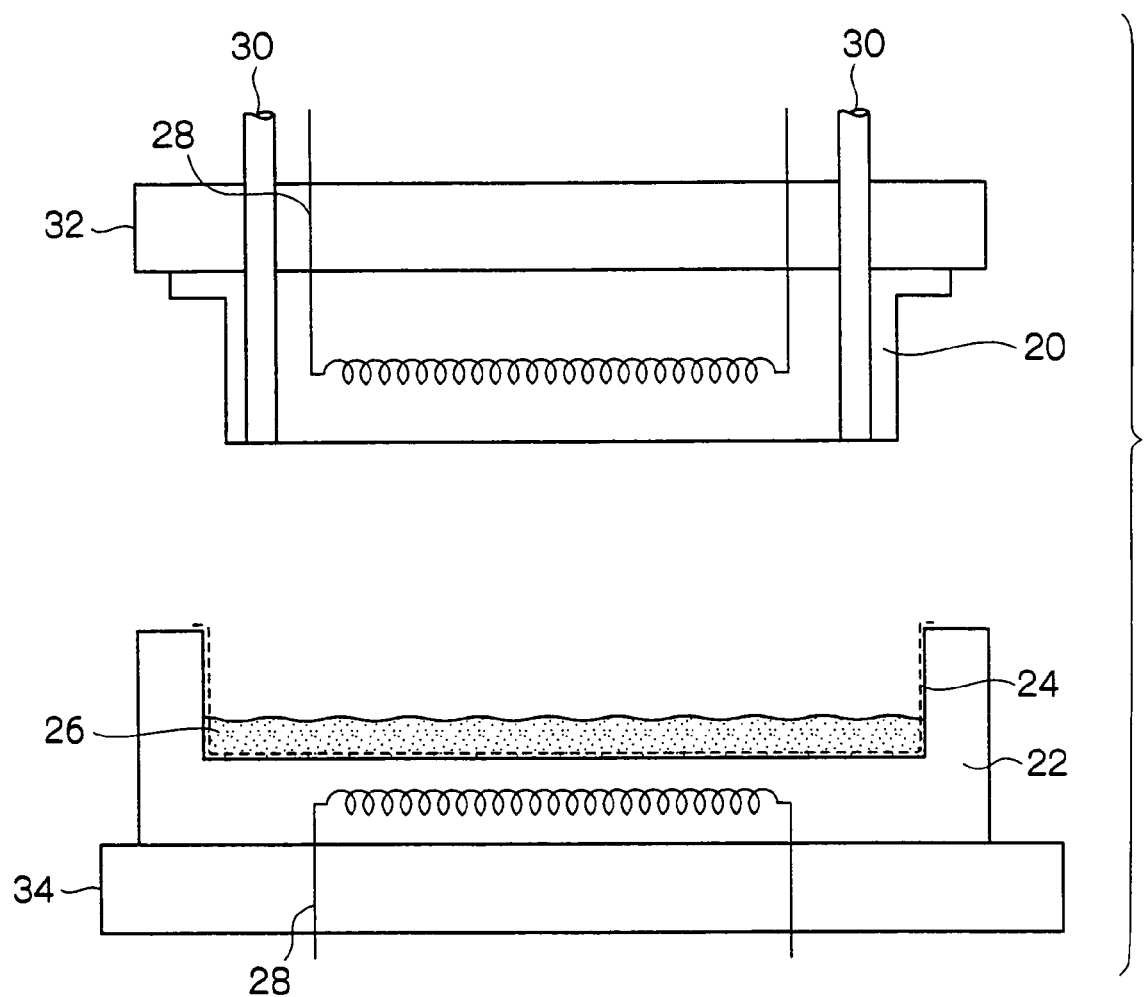
FIG. 2 is a schematic view for explaining an example of a direct pressure molding process, showing a state in which metal molds are open.
Figure 3:
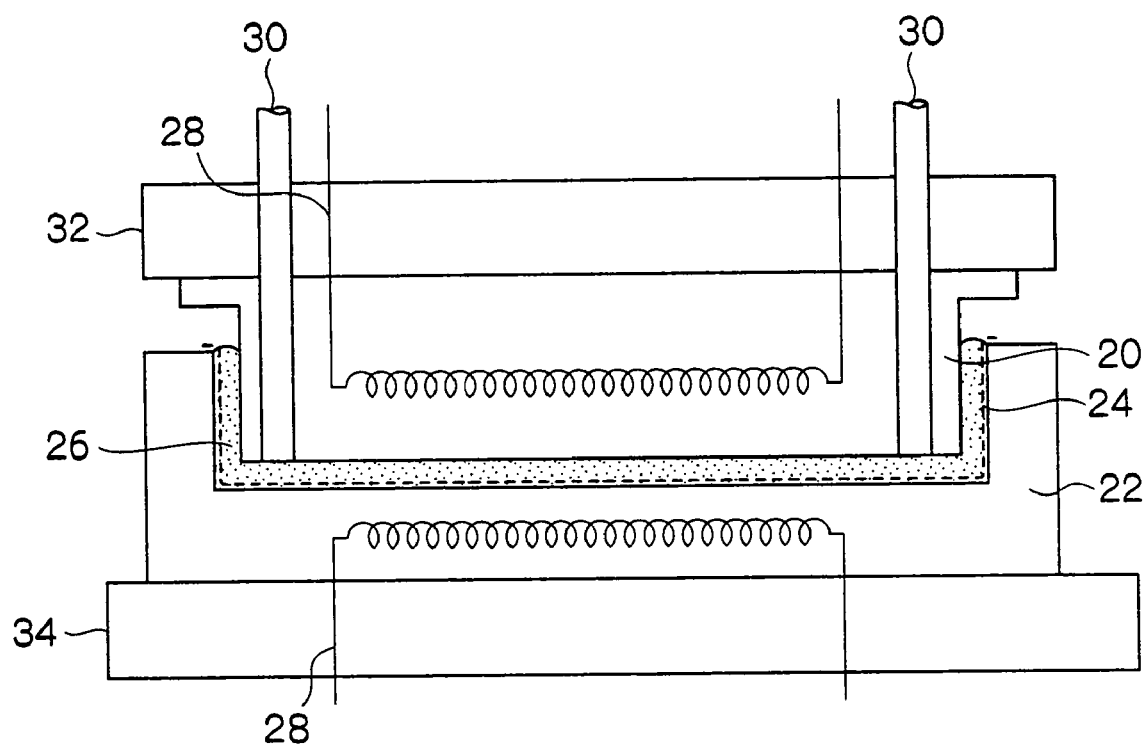
FIG. 3 is a schematic view for explaining an example of the direct pressure molding process, showing a state in which the metal molds are clamped.

An example of the direct pressure molding process will be described with reference to FIGS. 2 and 3. FIGS. 2 and 3 are schematic views for explaining the example of the direct pressure molding process. FIG. 2 shows a state in which metal molds are open, while FIG. 3 shows a state in which the molds are clamped together.

A direct pressure molding machine shown in FIG. 2 is formed by a core metal mold 20 mounted to a core metal mold mounting plate 32, and a cavity metal mold 22 mounted to a cavity metal mold mounting plate 34. Knockout pins 30 are disposed at the core metal mold 20, and a wire mesh filter 24 is disposed at the cavity metal core 22 so as to be spaced a predetermined distance therefrom. Further, a heater 28 is provided at the core metal mold 20 and the cavity metal mold 22.

In the molding by the direct pressure molding machine shown in FIG. 2, first, the temperature of the core metal mold 20 and the cavity metal mold 22 is adjusted to 70 to 150° C. and preferably to 90 to 120° C., and a liquid product 26 of the present invention is supplied to a concave portion of the wire mesh filter 24 by an unillustrated liquid product supply means. A portion of the supplied liquid product 26 which has passed through the wire mesh filter 24 is collected by an unillustrated collecting means. After the collection, the cavity metal mold 22 is moved and clamped to the core metal mold 20.

The collected portion of the liquid product 26 can be mixed with the liquid cellulose acetate in the dehydrating and acetylating treatment for reuse.

FIG. 3 shows a state in which the metal molds are clamped together. The liquid product 26 is solidified in the clamped state shown in FIG. 3. Although clamping force varies according to the configuration and structure of a molding, clamping force in general is preferably about 10 t. Clamping time is preferably 1 to 10 minutes and more preferably 3 to 5 minutes.

Components in FIG. 3 which are similar to those in FIG. 2 are designated by the same reference numerals, and detailed description thereof is omitted.

After the liquid product 26 is solidified, the cavity metal mold 22 is moved to open the metal molds. At that time, the solidified liquid product 26 is adhered to the core metal mold 20. Therefore, the solidified liquid product 26 is separated from the core metal mold 20 by pushing down the knockout pins 30. The liquid product 26 thus obtained is heated and dried, and subsequently subjected to a trimming finish, internal coating, and deburring with a press metal mold or the like to obtain a cellulose molding. The above process can be repeated.

The above direct pressure molding can shorten the molding time because the filtering and dehydrating step, in which the liquid product 26 is supplied to the concave portion of the wire mesh filter 24 and pressed by the core metal mold 20, and the shaping and thermosetting step, in which the liquid product 26 is shaped and hardened by the core metal mold 20 and the cavity metal mold 22 that have reached a hardening temperature, can be carried out at the same time. Thus, a cellulose molding can be obtained simply.

The obtained cellulose molding is biodegradable and can be preferably used as a food tray, a lunch container, or the like.

A plant component extracting apparatus according to a second embodiment of the present invention, which will be described later, can be preferably used in the steaming and filtration treatments of the process for manufacturing cellulose acetate of the present invention.

According to the process for manufacturing a cellulose molding in the first embodiment of the present invention, a cellulose molding, which is biodegradable and includes as a raw material corncob meal that has hitherto been thrown away, can be obtained simply and at a low cost.

Plant Component Extracting Apparatus

Next, a plant component extracting apparatus according to a second embodiment of the present invention will be described. The plant component extracting apparatus of the present invention can be preferably used in the foregoing process for manufacturing a cellulose molding according to the first embodiment of the present invention. Further, the plant component extracting apparatus of the present invention can also be used in a process for manufacturing cellulose acetate according to a third embodiment of the present invention, which will be described later.

A steaming method and an extraction method with a solvent have conventionally been used as methods for extracting a useful component, such as cellulose, from a plant. However, as described above, these methods are inadequate as an extraction method used to separate and purify cellulose, in view of substantial time and labor for the separation of lignin which requires many steps and the use of an agent such as sodium sulfide, and high cost required for the separation.

The plant component extracting apparatus of the present invention can separate and extract, in a simple, continuous and rapid manner, a plant component such as cellulose, which is a main component of a biodegradable plastic, without using an agent or using many steps.

The plant component extracting apparatus according to the second embodiment of the present invention is used to steam a plant raw material by using hot water under high temperature and high-pressure conditions. Specifically, the plant component extracting apparatus is formed by raw material processing means including a raw material supply portion for supplying a plant raw material and a raw material pressurizing portion for heating and pressurizing the supplied plant raw material at 150 to 350° C. and 5 to 30 MPa, respectively; hot water supply means including a pressurizer and a heater and supplying sub-critical water having a temperature of 300 to 350° C. pressurized at a pressure of 28 to 30 MPa; and hot water reacting means for carrying out a steaming treatment by mixing the heated and pressurized plant raw material with the sub-critical water supplied from the hot water supply means.

In the plant component extracting apparatus of the present invention, steaming is carried out by adding, to the plant raw material heated to 150 to 300° C. and pressurized to 5 to 30 MPa, sub-critical water (hot water) having a temperature of 300 to 350° C., and kneading the resulting mixture while maintaining the conditions of the temperature and the pressure. In this way, the decomposition and removal of lignin from lignocellulose, which have hitherto required use of an agent and many steps, can be simply and quickly carried out in a single step. Namely, the plant raw material supplied through the raw material supply portion, which forms the raw material processing means, is pressurized (and preferably compressed) to the aforementioned pressure range while heated to the aforementioned temperature range in the raw material pressurizing portion, and pressed into the hot water reacting means from the raw material processing means under the same pressure condition. Subsequently, hot sub-critical water (hot water) is added to the raw material, and the mixture is kneaded. Therefore, the steaming treatment can be continuously carried out in a series of processing systems enabling continuous processing, unlike conventional steaming processes in which a plurality of steps are repeated on a certain scale.

In the present invention, a mixture of polyphenol (formed by a change from decomposed and removed lignin) and cellulose which are formed by the decomposition of lignocellulose, and soluble hemicellulose (soluble xylan) is obtained as products (which may hereinafter be referred to as the "decomposition products") by the steaming. Further, when a filtering device is provided, the mixture can be filtered to separately collect filtrate containing polyphenol and soluble xylan, and cellulose (pulp of high quality) as a residue.

The raw material pressurizing portion forming the raw material processing means serves to pressurize the plant raw material, which is supplied through the raw material supply portion, at a temperature of 150 to 350° C. (preferably 180 to 300° C.) and a pressure of 5 to 30 MPa (preferably 15 to 28

MPa). The temperature and the pressure can be appropriately selected from the above ranges according to the type of the plant raw material. In the raw material pressurizing portion, application of a pressure necessary for the steaming treatment in the hot water reacting portion, and preheating are carried out at the same time. Further, gas included in the raw material is removed. Furthermore, at this time, at least a portion of the plant raw material can be decomposed by the water included in the raw material.

For example, in the process of obtaining cellulose and xylan (hemicellulose) from corncobs, namely cores of corns, used as the plant raw material, hot water is added under the condition of a pressure of 28 to 30 MPa. In the process of extracting fat and oil and producing light oil from sunflower seeds used as the plant raw material, the raw material is pressurized to 15 to 20 MPa. The steaming treatment can be continuously carried out by the hot water reacting means operating hot water in these pressure ranges.

The hot water supply means includes a pressurizer and a heater for generating and supplying sub-critical water having high temperature and pressure, and may further have a water purification mechanism including a water tank, a filtering device, ion exchange equipment, and the like, if necessary. The water purification mechanism is used to remove impurities and ions included in raw water to, for example, prevent clogging of the heater, pipes and the like. The pressurizer is preferably a plunger type pump, and particularly preferably a plunger type pump having a rated flow of 10 liters/minute at a discharge pressure of 30 MPa. The heater is preferably a heat exchanger of molten salt bath heating type, which uses a nickel alloy coil.

The sub-critical water is hot water having a temperature and a pressure lower than those at the critical point of water (i.e., a temperature of 375° C. and a pressure of 22 MPa). The sub-critical water in the present invention is water having a pressure of 28 to 30 MPa and a temperature of 300 to 350° C.

The hot water reacting means for carrying out the steaming may be formed by a hollow body through which the plant raw material and the hot water pass, and a plurality of moving vanes provided inside the hollow body and disposed adjacent to each other so as to be rotated with a direction in which the plant raw material and the hot water pass through the hollow body being the axis of rotation. It is effective when the moving vanes are disposed adjacent to each other so as to alternately rotate in reverse directions with the direction in which the plant raw material and the hot water pass through the hollow body being the axis of rotation. The steaming treatment is carried out at high temperature and high pressure by using the plant raw material and water. In the above structure, it is not absolutely necessary to provide a heating means at the hot water reacting means because the steaming treatment can be carried out by using the heat and pressure applied by the raw material processing means, and the heat of the sub-critical water supplied. However, the hot water reacting means may be formed so as to be heatable, if necessary, such as a structure in which the hollow body is heated from the outside.

The moving vanes of the hot water reacting means are preferably structured so as to be rotated by fluid pressure generated by the flow of the fluid passing through the hollow body, i.e., the flow of the hot water and the plant raw material heated and pressurized by the raw material processing means (e.g., vane-shaped stators or the like which are twisted so as to be rotated by force in the direction of the flow). This structure enables continuous stirring without connecting a drive portion. Since the moving vanes can be provided so as to be adjacent to each other and alternately rotated in reverse directions with the direction in which the fluid passes being the axis of rotation, the plant raw material and the hot water are kneaded efficiently, whereby the steaming treatment can be sufficiently carried out. As a result, a short or compact hot water reacting means can be formed without lowering the efficiency of steaming. Alternatively, the hot water reacting means may be formed so as to be rotated by a motor connected to a power source or by magnetic force. The hollow body is formed so as to pass the plant raw material and the hot water there through, and may have a cross-section of any shape, such as a circular, oval, square or rectangular shape. The hollow body having a circular cross-section is particularly preferable.

Further, at least the moving vanes and an inner wall of the hollow body are preferably formed of nickel alloy. A supply pipe for supplying the plant raw material, a supply pipe for supplying the hot water, and a discharge pipe for discharging a decomposition product generated by the steaming are connected to the hot water reacting means. A commercially available static mixer or the like, such as one manufactured by Noritake Co., Ltd., can be suitably used.

The temperature and pressure inside the hot water reacting means during the steaming treatment vary according to the type of the plant raw material or intended use. For example, when corncobs are used as the raw material, it is preferable to set the temperature to 150 to 250° C. (preferably 180 to 200° C.) and the pressure to 28 to 30 MPa. When sunflower seeds are used as the raw material, it is preferable to set the temperature to 130 to 220° C. (preferably 180 to 200° C.) and the pressure to 15 to 20 MPa. The duration of the steaming treatment is preferably 10 to 30 minutes and more preferably 15 to 20 minutes.

The raw material pressurizing portion of the raw material processing means may be formed by a hollow base body at which the raw material supply portion is provided, a rod-shaped rotating body disposed inside the hollow base body and having a spiral groove, the width of which narrows from one end at which the raw material supply portion is provided to the other, and a heater for heating the inside of the hollow base body. A discharging port is provided at the other end of the hollow base body at which the raw material supply portion is not provided. With this structure, when the rod-shaped rotating body is rotated, the plant raw material is pressed, while heated, along the spiral groove from the end at which the raw material supply portion is provided toward the discharging port at the other end, and can be compressed at a desired pressure.

Although the hollow base body may be structured so as to have a cross-section of any shape such as a circular, oval, square or rectangular shape, the hollow base body preferably has a circular cross-section because the pressure applied to the plant raw material by the rod-shape rotating body rotated inside the substrate becomes uniform. Further, the spiral groove is provided at the rod-shaped rotating body from the one end toward the other end thereof so that the pitch (width) of the groove gradually narrows from the raw material supply portion side toward the discharging port side when the rotating body is disposed in the hollow base body. With this structure, the plant raw material is conveyed while pressed. The rotating body is preferably formed in the shape of a rod having a substantially circular cross-section in terms of enabling efficient and uniform compression.

Further, the raw material processing means may have plural units of the raw material pressurizing portion, which may be connected in a series according to the type of the plant raw material or intended use. For example, when corncobs, i.e., cores of corn, are used as the raw material, four units of the raw material pressurizing portion are preferably connected in a series to steam the raw material at a pressure of 28 to 30 MPa. When sunflower seeds are used as the raw material, three units of the raw material pressurizing portion are preferably connected in a series to steam the raw material at a pressure of 15 to 20 MPa.

Water may be added to the raw material processing means. However, by adding hot water in the hot water reactor as described above, the steaming treatment can be carried out under desired conditions while the amount of water is easily adjusted.

Moreover, the plant component extracting apparatus of the present invention may further include cooling means for cooling the decomposition product, which has been produced by decomposition in the steaming treatment, by mixing the decomposition product with cold water or by carrying out heat exchange (e.g., by a heat exchanger or the like using a circulatory system for circulating water) at the outside instead of mixing the decomposition product with cold water. The former has an advantage in that the decomposition product can be quickly cooled because it is cooled by directly adding cold water thereto. Further, a filtration treatment after cooling is simplified, and a high-pressure heat exchanger, which is necessary when the pressure is not decreased during the cooling, is unnecessary, thereby enabling further reduction in cost.

When the decomposition product is cooled by mixing cold water therewith, the cooling means may be formed, as in the case of the hot water reacting means described above, by a hollow body through which the plant raw material and the hot water pass, and a plurality of moving vanes provided inside the hollow body and a plurality of moving vanes disposed adjacent to each other so as to be rotated with a direction in which the decomposition product and water pass being the axis of rotation. It is effective when the moving vanes are disposed adjacent to each other and alternately rotated in reverse directions with the direction in which the decomposition product and water pass being the axis of rotation. The structures and materials of the moving vanes and the hollow body may be similar to those of the hot water reacting means, and the moving vanes are preferably structured to be rotated by fluid pressure generated by the flow of cold water and the decomposition product after the steaming (e.g., vane-shaped stators which are twisted so as to be rotated by force in the flow direction). However, the moving vanes may be structured so as to be rotated by a motor connected to a power source or by magnetic force.

Nickel alloy is preferably used as the material for the moving vanes and at least an inner wall of the hollow body of the cooling means as well. Specifically, a static mixer or the like, such as one manufactured by Noritake Co., Ltd., is preferable. A supply pipe for supplying the decomposition product, a supply pipe for supplying the cold water, and a discharge pipe for discharging a cooled product are connected to the cooling means. As a result, a short or compact cooling means can be formed without lowering the cooling efficiency.

A cooling water supply means for generating and supplying cooling water can be connected to the cooling means. The cooling water supply means may be formed by a pressurizer, a cooling mechanism, and, if necessary, a purification mechanism including a water tank, a filtering device, ion exchange equipment and the like. The purification mechanism is used to remove impurities and ions included in raw water to, for example, prevent clogging of the heater, pipes and the like. The pressurizer is preferably a plunger type pump, and particularly preferably a plunger type pump having a rated flow of 10 liters/minute at a discharge pressure of 30 MPa. A commonly used cooling device may be used as the cooling mechanism.

Since the decomposition product produced in the steaming treatment is a mixture of polyphenol and cellulose, and soluble xylan, a filtering device may be provided for filtering and separating the decomposition product into filtrate containing polyphenol and soluble xylan, and cellulose (pulp of high quality) as a residue, after the steaming by the hot water reacting means. Filtration may be carried out after the produced decomposition product is temporarily stored in a storage tank, or may be carried out without storing. The filtering device may have a storage function so as to store the filtrate and residue after filtration. Further, a storage tank for separately storing the filtrate and the residue may be provided separately from the filtering device.

In the present invention, any plant may be used as the raw material regardless of whether the plant is wood or non-wood. For example, from a point of view that the resulting cellulose can be used to manufacture biodegradable plastic of good quality in the end, it is particularly preferable to use at least one selected from the group consisting of corncobs, which are cores of corn, plant seeds such as sunflower seeds, bagasse, which is cane trash obtained after sugar cane is squeezed to extract sugar therefrom, kenaf, reeds, and rice straw.

An embodiment of the plant component extracting apparatus of the present invention will be described below with reference to the drawings. In the following, a case in which corncobs are used as the plant raw material will be mainly described. However, the present invention is not limited to this embodiment.

The embodiment of the plant component extracting apparatus of the present invention will be described with reference to FIGS. 4 to 12. In the present embodiment, corncobs are used as a raw material, and an entire system is kept at a high pressure of 5 to 30 MPa. A steaming treatment is carried out by adding to the system sub-critical water having a temperature of 300 to 350° C. Due to a decomposition reaction of lignocellulose caused by the steaming treatment, a mixture of polyphenol and cellulose (pulp of high quality), and soluble hemicellulose (soluble xylan) are obtained. The mixture is stored and filtered to separate the cellulose from the soluble xylan and the polyphenol. Further, the resulting decomposition product is cooled after the steaming treatment by adding cold water to the product.

Figure 4:
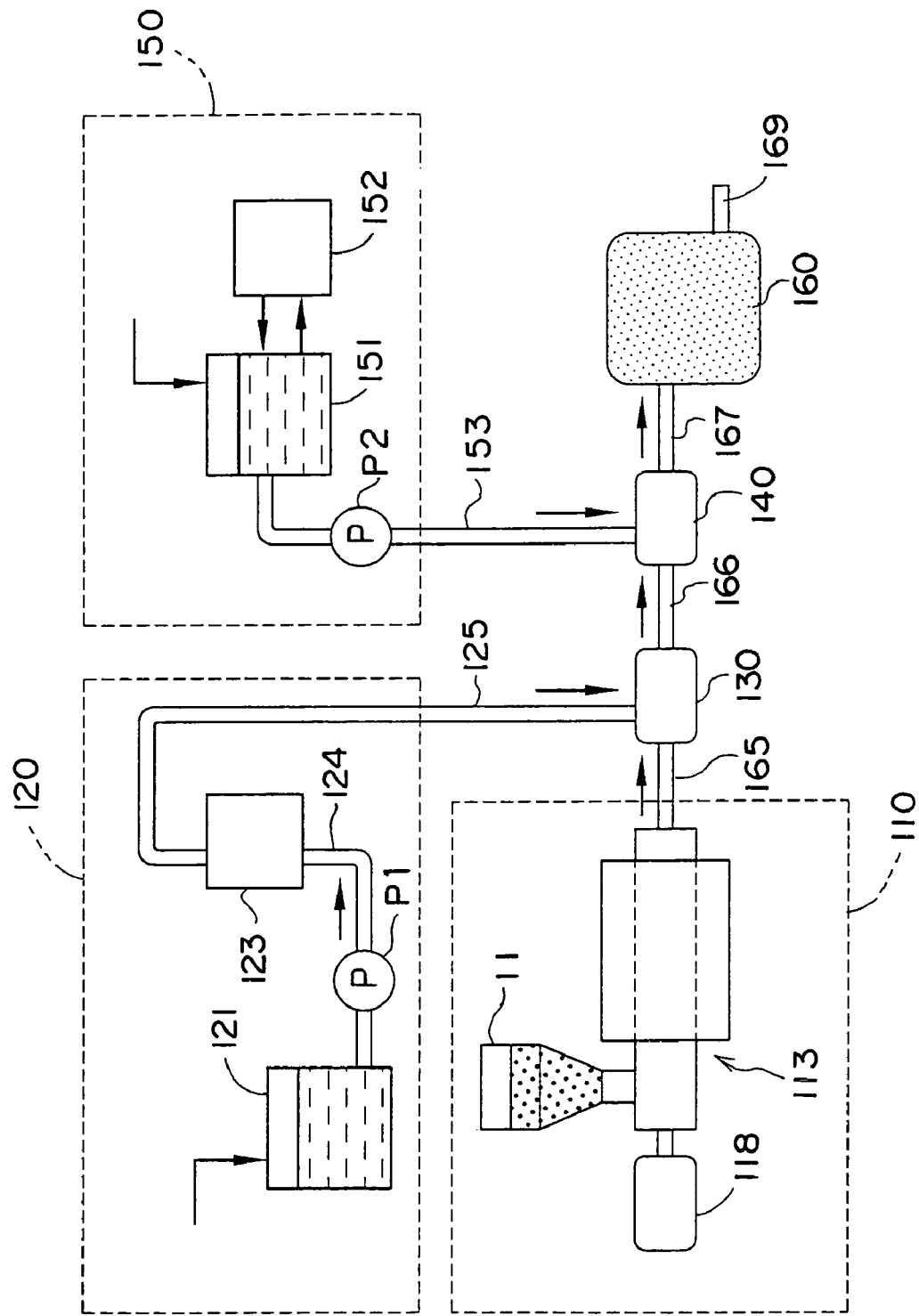
FIG. 4 is a schematic structural diagram of an apparatus according to a second embodiment of the present invention.

As shown in FIG. 4, the present embodiment includes a raw material processing apparatus (raw material processing means) 110, a sub-critical water supply apparatus (hot water supply means) 120, a hot water reactor (hot water reacting means) 130, a cooler (cooling means) 140, a cooling water supply apparatus (cooling means) 150, and a filtration and storage device 160. The raw material processing apparatus 110 includes a raw material supply portion for supplying corncobs and a raw material pressurizing portion for applying heat and pressure to the supplied corncobs. The sub-critical water supply apparatus 120 includes a booster pump and a molten salt heating device and supplies sub-critical water to the outside. The hot water reactor 130 mixes the heated and pressurized corncobs with the sub-critical water to carry out a steaming treatment. The cooler 140 mixes cold water with a product (decomposition product) produced in the steaming treatment to cool the product. The cooling water supply apparatus 150 includes a booster pump and a cooling mechanism and supplies cold water. The filtration and storage device 160 includes a storage tank for storing the cooled decomposition product, and a filtering device for filtering the decomposition product.

Figure 5:
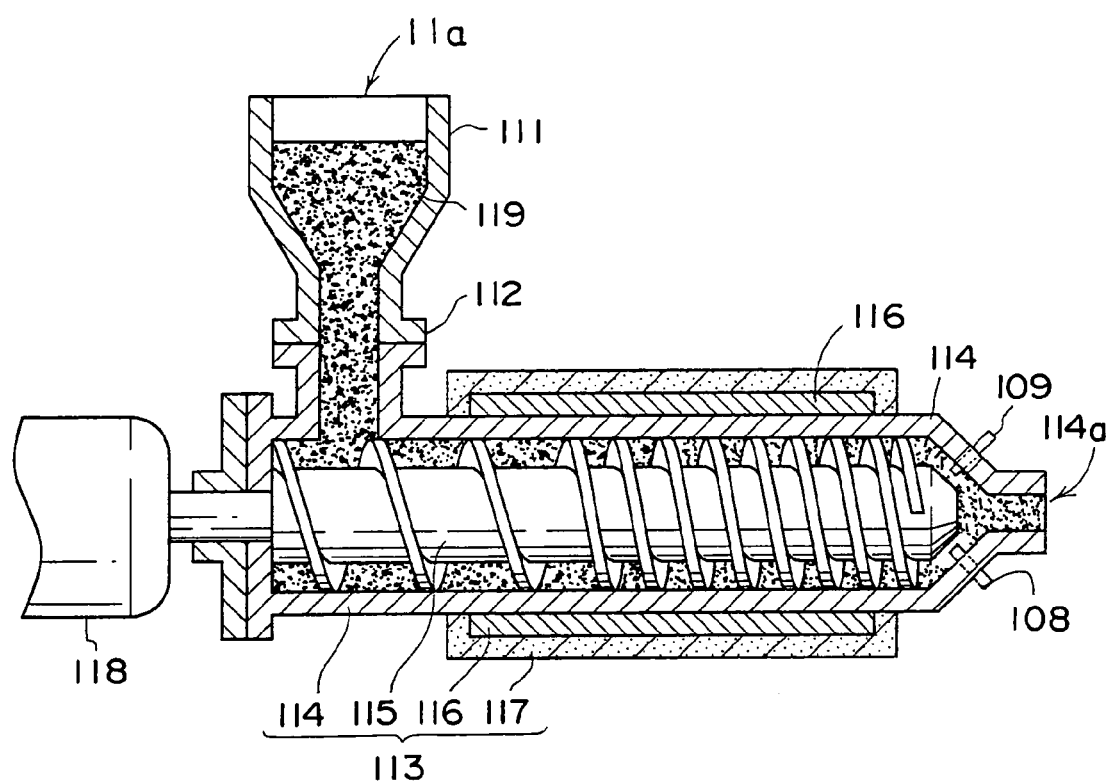
FIG. 5 is an enlarged schematic cross-sectional view of an example of a raw material processing apparatus.

As shown in FIG. 5, the raw material processing apparatus 110 is formed by a raw material supply portion 111 for supplying corncobs 119, and a raw material pressurizing portion 113 for heating and pressurizing the corncobs 119 supplied through the raw material supply portion 111 to compress the corncobs 119. FIG. 5 is an enlarged schematic cross-sectional view showing an example of the raw material processing apparatus.

The raw material supply portion 111 includes a raw material input port 111a and an input port shutter 112, such that corncob 119 supplied through the raw material input port 111a are temporarily held or supplied to the raw material pressurizing portion 113 by closing or opening the input port shutter 112. With this structure, the raw material, namely, corncob 119, can be supplied continuously.

Further, an unillustrated feed pump is attached to the raw material input port 111a such that corncobs are supplied by the feed pump through the raw material input port 111a into a cylinder 114. Corncobs can be automatically supplied by controlling the feed pump according to the amount required.

Although the shape of corncobs inputted is not particularly limited, corncobs are preferably formed into chips having a diameter of about 2 to 3 mm.

The raw material pressurizing portion 113 is formed such that a screw (rod-shaped rotating body) 115 is disposed in the cylinder (hollow substrate) 114 at which the raw material supply portion 111 is provided. The screw 115 has a spiral groove, and the pitch thereof shortens from an end of the screw, at which the raw material supply portion 111 is provided, towards the other end (i.e., a distal end of the screw). A discharging port 114a is provided at the other end of the cylinder 114 (the distal end of the screw) at which the raw material supply portion 111 is not provided. When the screw 115 is rotated, the corncobs are heated and pressurized, and discharged from the discharging port 114a in a compressed state. A motor (drive means) 118 is provided at the side of the screw 115 at which the raw material supply portion 111 is provided. The screw 115 is connected to the motor 118 via an unillustrated reduction gear including a prime gear and a driven gear, and is rotated by electric power supplied from a power source (not shown).

By the rotation of the screw 115 inside the cylinder, the corncobs supplied are heated at a temperature of 150 to 350° C. and pressurized at a pressure of 28 to 30 MPa so as to be compressed. The temperature is preferably 150 to 250° C., and more preferably 180 to 200° C. The corncobs in this state are hereinafter referred to as the "compressed corncobs".

An electric heater 116 for heating the inside of the cylinder via a wall thereof, and a heat retaining jacket 117 for retaining heat by covering the electric heater 116 are provided at the outside of the cylinder 114 so as to surround the cylinder, whereby the inside of the cylinder can be uniformly heated. Further, a temperature sensor 108 and a pressure sensor 109 are provided near the discharging port 114a of the cylinder 114.

Two or more units of the raw material processing apparatus 110 can be connected in a series. In this case, the temperature and the pressure of each unit of apparatus may be the same or different from one another as long as the apparatus connected to the hot water reactor 130 satisfies the conditions of the temperature of 150 to 350° C. and the pressure of 5 to 30 MPa. In the case in which the conditions differ from one apparatus to another, it is preferable for the temperature and pressure to rise from the first apparatus to the second, the third, . . . , and the last "n"th apparatus (n≧2).

Further, the raw material processing apparatus is pressurized and heated in advance for a steaming treatment by the hot water reacting means. Furthermore, gas included in the raw material is removed.

The sub-critical water supply apparatus 120 includes a water tank 121 for temporarily storing water, a molten salt heating device 123, and a plunger type booster pump P1. The water tank 121 is connected to the molten salt heating device 123 via a supply pipe 124 at which the plunger type booster pump P1 is provided. The water is pressurized by the plunger type booster pump P1 to a desired pressure, and in this state, the water is heated to thereby generate hot sub-critical water. A pressure of 28 to 30 MPa is applied to the water, and in this pressurized state, the water is further heated to generate sub-critical water (hot water) having a temperature of 300 to 350° C.

Moreover, an end of a supply pipe 125 for supplying sub-critical water is connected to the molten salt heating device 123. The molten salt heating device 123 is connected to the hot water reactor 130 via the supply pipe 125 so that the sub-critical water can be continuously supplied to the hot water reactor 130. The amount of the sub-critical water supplied to the hot water reactor 130 is preferably 10 to 1000 parts by mass, and more preferably 50 to 100 parts by mass, relative to 100 parts by mass of corncob meal.

Figure 6:
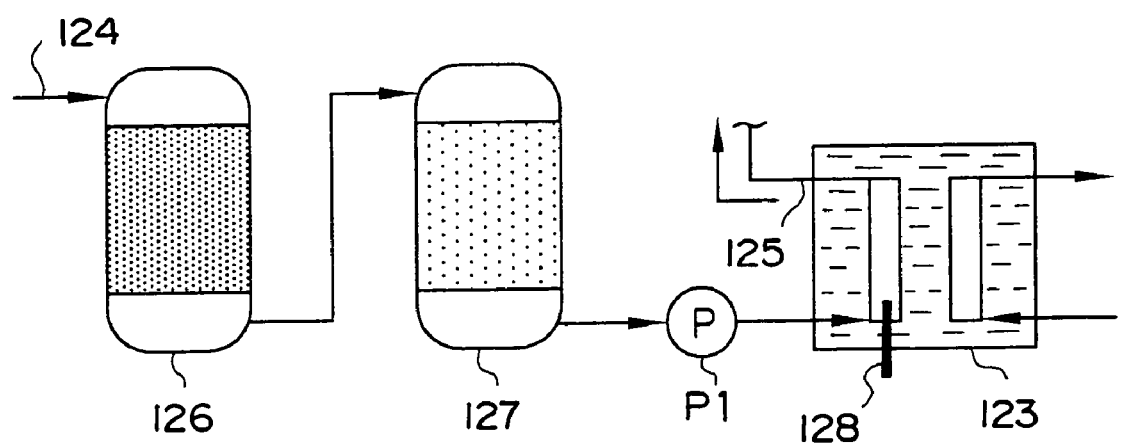
FIG. 6 is a schematic view for explaining an exemplary structure of a sub-critical water supply apparatus.

Further, as shown in FIG. 6, an activated carbon filter 126 and ion exchange equipment 127 are disposed at the supply pipe 124 between the water tank 121 and the booster pump P1, such that impurities and ions included in the water are removed in advance. The molten salt heating device 123 is a heat exchanger formed by a molten salt bath, a heat exchange chamber provided inside the bath, a nickel alloy coil, and a temperature sensor 128 for measuring the temperature of the water. The water, which has impurities and the like removed therefrom and is pressurized by the booster pump P1 and supplied to the molten salt heating device 123, is heated in the heat exchange chamber and then fed to the supply pipe 125. At this time, the temperature of the sub-critical water can be indirectly controlled by controlling the temperature of the molten salt bath.

Figure 7:
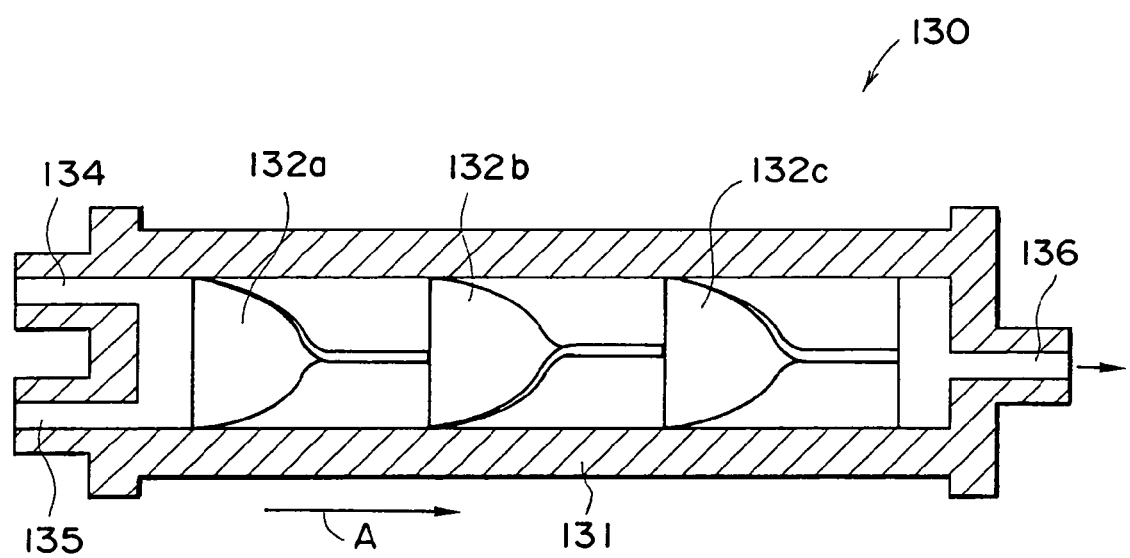
FIG. 7 is a schematic cross-sectional view of an exemplary structure of a hot water reactor.
Figure 9:
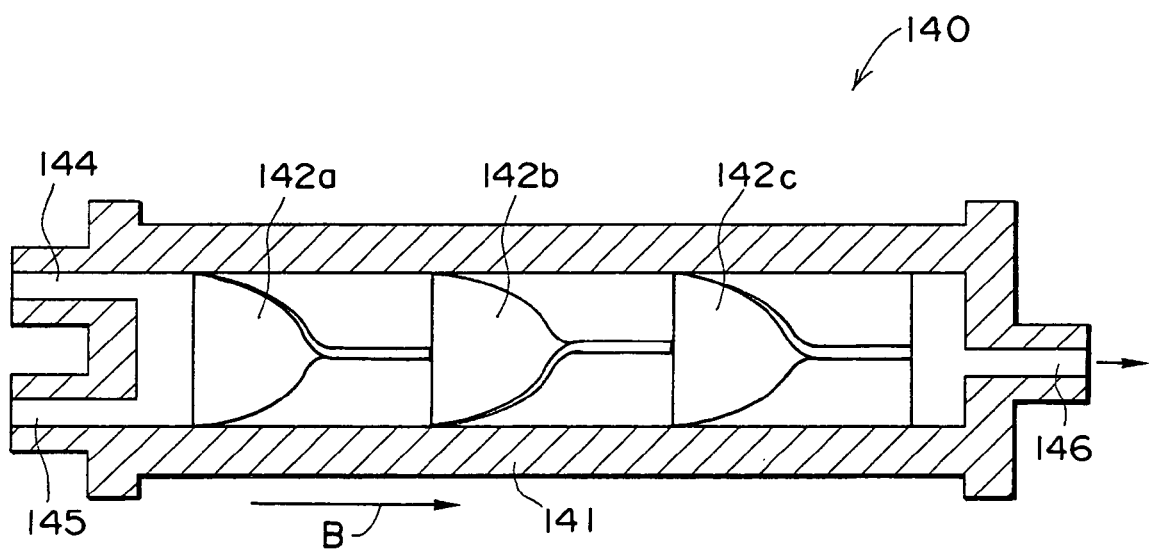
FIG. 9 is a schematic cross-sectional view showing an exemplary structure of the cooler.

The hot water reactor 130 is connected to an end of a supply pipe 165, the other end of which is connected to the discharging port 114a of the raw material processing apparatus 110. Namely, the hot water reactor 130 is connected to the raw material processing apparatus 110 via the supply pipe 165. As shown in FIG. 7, the hot water reactor 130 is formed by a cylindrical body 131 and three stators (twisted vanes) 132a, 132b and 132c disposed in the cylindrical body 131. The cylindrical body 131 has a circular cross-section and includes a compressed raw material supply port 134 and a hot water supply port 135 at one end, and a product discharging port 136 at the other end thereof. The stators 132a, 132b and 132c are disposed adjacent to each other and alternately rotated in reverse directions with an axis parallel to a direction, in which compressed corncobs and sub-critical water pass (i.e., a direction of arrow A in FIG. 7), being the axis of rotation. The steaming treatment is performed by the stators being successively rotated in reverse directions such that the compressed corncobs and the sub-critical water, which are supplied through the compressed raw material supply port 134 and the hot water supply port 135, respectively, are kneaded while passing through the cylindrical body 131. Further, the product discharging port 136 is connected to one end of a supply pipe 166, which in turn is connected to the cooler 140.

Each of the stators 132a, 132b and 132c is formed by, for example, twisting a nickel alloy plate to the left or right (e.g., at an angle of 90°), as shown in FIG. 8. The stators 132a, 132b and 132c are subjected to a fluid pressure in the direction of arrow A when the compressed corncobs and the sub-critical water pass through the cylindrical body 131, and thus are rotated in accordance with the orientation of the twist.

The temperature and the pressure of the hot water reactor in the present embodiment are 150 to 250° C. (preferably 180 to 200° C.) and 28 to 30 MPa, respectively, and can be adjusted according to the conditions of the temperature and pressure of the raw material processing apparatus 110, the temperature of the sub-critical water, and the amount of the sub-critical water supplied. In this way, steaming can be carried out under the conditions of the raw material processing apparatus and the hot water reactor, whereby the reaction can proceed successively.

In the above steaming treatment, a sulfurous acid compound such as sodium sulfite or calcium sulfite may also be added together with the sub-critical water. Addition of the sulfurous acid compound can shorten the time required for the steaming treatment. The sulfurous acid compound may be added in the compression process of the raw material processing apparatus 110, or added to the hot water reactor 130 together with the sub-critical water. The amount of the sulfurous acid compound added is preferably 1 to 10 parts by mass, and more preferably 2 to 5 parts by mass, relative to 100 parts by mass of the corncob meal.

As shown in FIG. 4, the other end of the pipe 166 and one end of a supply pipe 153 including a plunger type booster pump P2 are connected to the cooler 140. With this structure, a product (decomposition product) produced in the steaming treatment by the hot water reactor 130 is cooled by being mixed with cold water. In this way, the temperature of the product can be quickly lowered.

Similarly to the hot water reactor 130 described above, as shown in FIG. 9, the cooler 140 is formed by a cylindrical body 141 and three stators (twisted vanes) 142a, 142b and 142c disposed in the cylindrical body 141. The cylindrical body 141 has a circular cross-section and includes a decomposition product supply port 144 and a cold water supply port 145 at one end, and a cooled product discharging port 146 at the other end thereof. The stators 142a, 142b and 142c are disposed adjacent to each other and alternately rotated in reverse directions with an axis parallel to a direction, in which the decomposition product and cold water pass (i.e., a direction of arrow B in FIG. 9), being the axis of rotation. Further, the decomposition product supply port 144 is connected toward the other end of the pipe 166 connecting to the hot water reactor 130, and the cold water supply port 145 is connected to an end of a supply pipe 153 connecting to the cooling water supply apparatus 150. The cooler 140 is structured to knead and mix the decomposition product and cold water, which are respectively supplied through the decomposition product supply port 144 and the cold water supply port 145, by the stators being successively rotated in reverse directions, while passing the decomposition product and the cold water through the cylindrical body 141.

The cooling water supply apparatus 150 includes a water tank 151 for temporarily storing water and a cooling device 152, and is structured to circulate the stored water via the cooling device 152 and the water tank 151 to cool the water to a predetermined temperature. Further, the supply pipe 153, which is connected to the cold water supply port 145 and includes the plunger type booster pump P2, is connected to a side wall of the water tank 151 at the other end and can continuously supply cold water to the cooler 140 while the cold water is pressurized by the booster pump P2. Although the temperature of the water can be appropriately selected according to cooling efficiency, the temperature is preferably 2 to 5° C.

Figure 10:
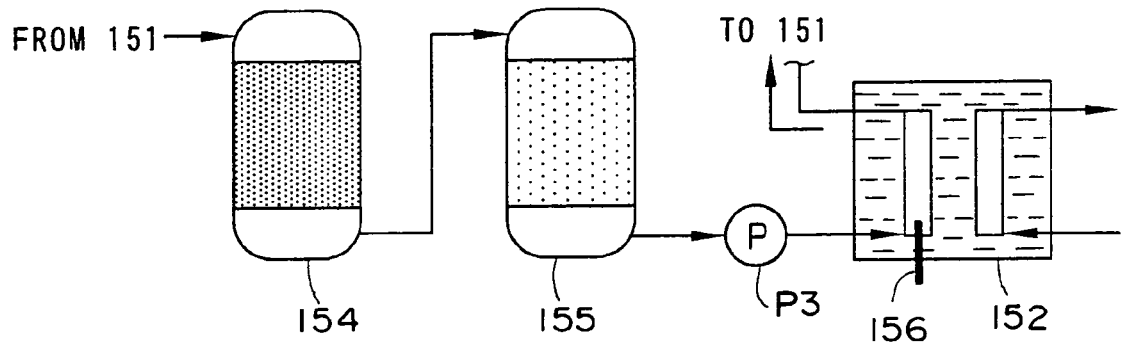
FIG. 10 is a schematic view for explaining an exemplary structure of a cooling water supply apparatus.

Moreover, as shown in FIG. 10, an activated carbon filter 154 and ion exchange equipment 155 are disposed between the water tank 151 and a booster pump P3, such that impurities and ions included in the water are removed in advance. A cooling device 152 is a heat exchanger formed by a water bath, a heat exchange chamber provided inside the water bath, a chiller (cooling mechanism), and a temperature sensor 156 for measuring the temperature of the water. The water, which has impurities and the like removed therefrom and is pressurized by the booster pump P2 and supplied to the cooling device 152, is cooled in the heat exchange chamber and then fed to the water tank 151. At this time, the temperature of the cold water can be indirectly controlled by controlling the temperature of the water bath.

Figure 11:
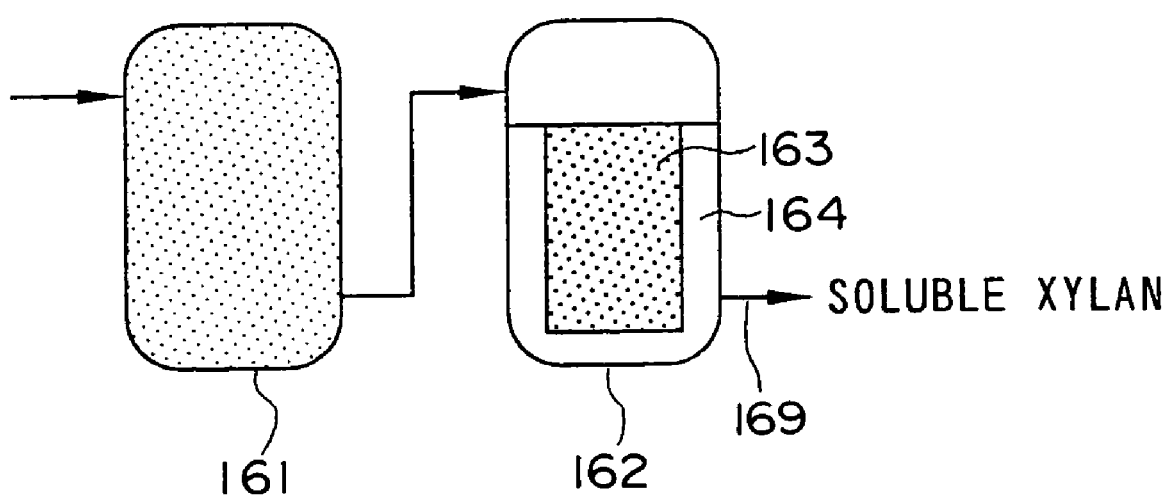
FIG. 11 is a schematic view for explaining an exemplary structure of a filtration and storage device.

A pipe 167 is connected at one end thereof to the cooled product discharging port 146 of the cooler 140. Namely, the cooler 140 is connected to the filtration and storage device 160 via the pipe 167. As shown in FIG. 11, the filtration and storage device 160 includes a storage tank 161 for storing the decomposition product (cooled product) which has been cooled in the cooler 140, and a filtering device 162 for filtering the decomposition product. The cooled decomposition product is temporarily stored in the storage tank 161, and subsequently filtered by the filtering device 162 to separate filtrate 164, containing soluble xylan and polyphenol, from cellulose 163, which is a residue after lignin is removed therefrom. Further, a discharge pipe 169 is connected at one end thereof to the filtering device 162 so that the filtrate (soluble xylan and the like) is discharged and collected. Alternatively, the filtrate and the residue obtained after the filtration may be stored in the filtering device 162.

The cellulose thus obtained is suitable as a raw material, which is a main component of biodegradable plastic. Further, xyloligosaccharides can be obtained by reacting soluble xylan with xylanase. Polyphenol can be used as an ingredient of food or as a raw material for medical products.

Figure 12:
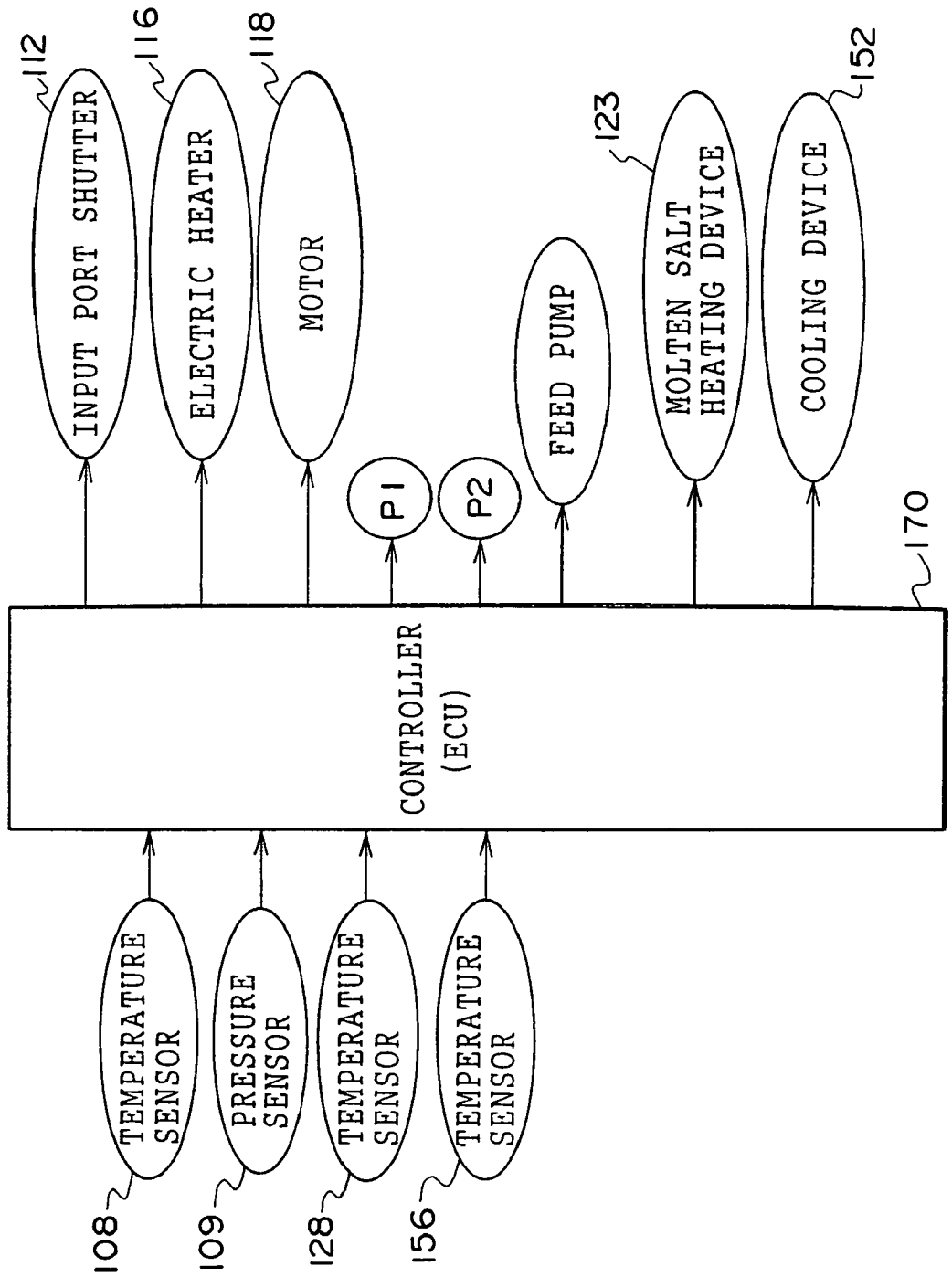
FIG. 12 is a block diagram of a controller according to the second embodiment of the present invention.

As shown in FIG. 12, the input port shutter 112, the electric heater 116, the motor 118, the temperature sensors 108, 128 and 156, the pressure sensor 109, the booster pumps P1 and P2 and the feed pump, the molten salt heating device 123, the cooling device 152, and the like which are described above are electrically connected to a controller (ECU) 170 so as to be controlled thereby.

In the present embodiment, an unillustrated feed pump mounted to the raw material input port 111a is driven to continuously supply corncob meal chips (chips having a length of about 2 to 3 mm, which are obtained by drying and crushing corncobs) 119 to the cylinder 114. The temperature of the cylinder 114 is adjusted to a desired temperature (150 to 250° C.) by the electric heater 116 while the input port shutter 112 is opened so that the corncob meal is supplied to the cylinder 114. As viewed from the motor 118, the rotary shaft of the motor 118 is rotated clockwise to rotate an unillustrated prime gear clockwise, an unillustrated driven gear counterclockwise and the screw 115 counterclockwise, thus heating the corncob meal while extruding the corncob meal toward the discharging port 114a. Since the pitch of the spiral groove of the screw 115 narrows toward the discharging port 114a, the corncob meal is compressed and subjected to a specific pressure of 28 to 30 MPa as it approaches the discharging port 114a. At this time, air included in the corncob meal serving as the raw material is pushed out of the raw material by the operation of the screw and discharged to the outside via an unillustrated gas separator mounted to the discharging port 114*a*. The compressed corncob meal is extruded from the discharging port 114*a* and supplied via the pipe 165 to the hot water reactor 130. At the same time, sub-critical water is continuously supplied from the sub-critical water supply apparatus 120.

At this time, the inside of the hot water reactor 130 is held at a pressure which is substantially the same as the pressure at which the corncob meal is compressed in the raw material processing apparatus and extruded therefrom. The steaming treatment is carried out (for 15 to 25 minutes) by using the heat of the corncob meal and the sub-critical water supplied. With this structure, the hot water reactor 130 can secure the reaction conditions of high temperature and high pressure from the time the corncob meal is supplied from the raw material processing apparatus 110, and consequently can conduct the steaming treatment uniformly and continuously. A decomposition product produced by the steaming treatment is supplied to the cooler 140 together with cold water (having a temperature of 2 to 5° C.) supplied from the cooling water supply apparatus 150, and is cooled. Subsequently, the cooled decomposition product is temporarily stored in the storage tank 161 with decreasing pressure, and then subjected to the filtration treatment in the filtering device 162.

The steaming treatment of the corncob meal by using the plant component extracting apparatus of the present invention as described above obtains a mixture of polyphenol (formed by a change from the lignin) and cellulose which are formed by the decomposition of lignocellulose, and soluble xylan (soluble hemicellulose) in a simple and continuous manner. Further, the filtration treatment of the mixture obtains cellulose (pulp of high quality) as a solid.

While, in the present embodiment, the temperature sensor 108 and the pressure sensor 109 are installed in the cylinder 114 near the distal end of the screw 115, it is sufficient for an installation position of the temperature sensor 108 to be further to the distal end side of the screw 115 than a middle portion, with respect to the axial direction, of the cylinder 114. The pressure sensor 109 may be installed in a space that is one fourth of the total length of the screw 115 from the distal end of the screw 115 of the cylinder 114.

Although the case in which corncobs are used as the raw material is mainly described in the above embodiments, the same applies to a case in which a plant other than the corncobs is used as the raw material.

The cellulose obtained by separating lignin with the filtration treatment is crystallized due to the formation of hydrogen bonds by the hydroxyl groups and is insoluble in both water and any solvent. Therefore, a dehydrating and acetylating treatment is carried out as described below for converting a portion of hydroxyl groups in the molecule to acetate groups to obtain plasticized cellulose acetate, which is soluble in both water and a solvent. The dehydrating and acetylating treatment is intended for reacting cellulose with acetic anhydride and sulfuric acid in a pressure vessel equipped with a stirrer to substitute acetate groups for the hydroxyl groups, causing the formation of hydrogen bonds in the cellulose, and is expressed by reaction formulae (1) and (2) below when n is the degree of polymerization and m is the degree of substitution.

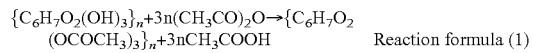
Reaction formula (1)

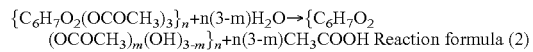
Reaction formula (2)

Reaction formula (1) shows that the reaction of cellulose and acetic anhydride produces cellulose acetate and acetic acid with the complete substitution of acetate groups. On the other hand, reaction formula (2) shows that the reaction of cellulose acetate produced in accordance with reaction formula (1) and water produces cellulose acetate having a degree of substitution m and acetic acid. The acetic acid produced in accordance with reaction formulae (1) and (2) can be reused.

For example, the dehydrating and acetylating treatment can be carried out in accordance with the following sequence. After the solid (cellulose) obtained by the filtration treatment is washed with water to remove alkali therefrom, sulfuric acid and acetic anhydride are added to and reacted with the obtained solid, acetic acid is removed (collected) from the resulting reaction product by a dehydrator, and is dried. The above procedure obtains cellulose acetate having an acetylation degree of 51 to 61. The amount of sulfuric acid added is preferably 1 to 10 parts by mass and more preferably 3 to 5 parts by mass relative to 100 parts by mass of dry cellulose. The amount of acetic anhydride added is preferably 1 to 20 parts by mass and more preferably 5 to 10 parts by mass, relative to 100 parts by mass of dry cellulose. Moreover, acetic acid can be preferably added, and the amount thereof added is preferably 1 to 10 parts by mass and more preferably 3 to 5 parts by mass relative to 100 parts by mass of cellulose.

The dehydrating and acetylating treatment is preferably carried out under a pressure of 5 to 15 MPa, and more preferably 8 to 10 MPa. The temperature for the dehydration and acetylation is preferably from 60 to 100° C. and more preferably from 70 to 90° C. The stirring speed for the dehydration and acetylation is preferably from 30 to 100 rpm and more preferably from 40 to 60 rpm. The duration of the dehydration and acetylation is preferably from 15 to 30 hours and more preferably from 20 to 24 hours.

While cellulose acetate itself is a biodegradable plastic, it is also possible to use cellulose acetate as a base and knead various kinds of materials (for example, corn starch and polylactic acid) therein to make biodegradable plastics of different properties.

According to the plant component extracting apparatus of the second embodiment of the present invention, a plant component such as cellulose, which is a main component of a biodegradable plastic, can be separated and extracted in a simple, continuous and rapid manner without using an agent or using many steps.

Process for Manufacturing Cellulose Acetate

In a process for manufacturing cellulose acetate according to a third embodiment of the present invention, first, at least one selected from bagasse, kenaf, reeds, and rice straw is steamed in a pressure vessel at 150 to 350° C. and 15 to 29 MPa. (This treatment may hereinafter be referred to as the "steaming treatment according to the third embodiment".)

"Bagasse" used in the present invention is cane trash obtained after sugar cane is squeezed to extract juice therefrom. Further, "kenaf" is an annual plant of the mallow family (hibiscus) and cultivated as a crop plant. "Reeds" are perennial plants of the Gramineae family and widely distributed in the temperate zone and the subtropical zone, and grow mainly on the waterfront. "Rice straw" refers to reaped and dried rice stalks with ears being removed therefrom.

The steaming treatment according to the third embodiment will be described.

The steaming treatment according to the third embodiment is a process of adding water to powdered bagasse or the like obtained by drying and crushing, and steaming the mixture in a pressure vessel at 150 to 350° C. and 15 to 29 MPa, which are defining the conditions for the sub-critical state (immediately before the supercritical state). The steaming treatment according to the third embodiment makes it possible to carry out the separation of lignin from lignocellulose, which has hitherto required many steps.

The steaming treatment according to the third embodiment requires a temperature of 150 to 350° C. and a pressure of 15 to 29 MPa, preferably a temperature of 150 to 250° C. and a pressure of 15 to 25 MPa, and more preferably a temperature of 180 to 200° C. and a pressure of 25 to 28 MPa.

The amount of water added is preferably 10 to 1000 parts by mass and more preferably 50 to 100 parts by mass, relative to 100 parts by mass of bagasse or the like.

The steaming treatment is preferably carried out for 10 to 30 minutes, and more preferably for 15 to 20 minutes.

Moreover, in the steaming treatment according to the third embodiment, a sulfurous acid compound may be added to the bagasse or the like, together with water. The addition of the sulfurous acid compound to the bagasse or the like makes it possible to shorten the time for the steaming treatment. Examples of the sulfurous acid compound include sodium or calcium sulfite.

The amount of the sulfurous acid compound added is preferably 1 to 10 parts by mass, and more preferably 2 to 5 parts by mass, for 100 parts by mass of bagasse or the like.

Figure 13:
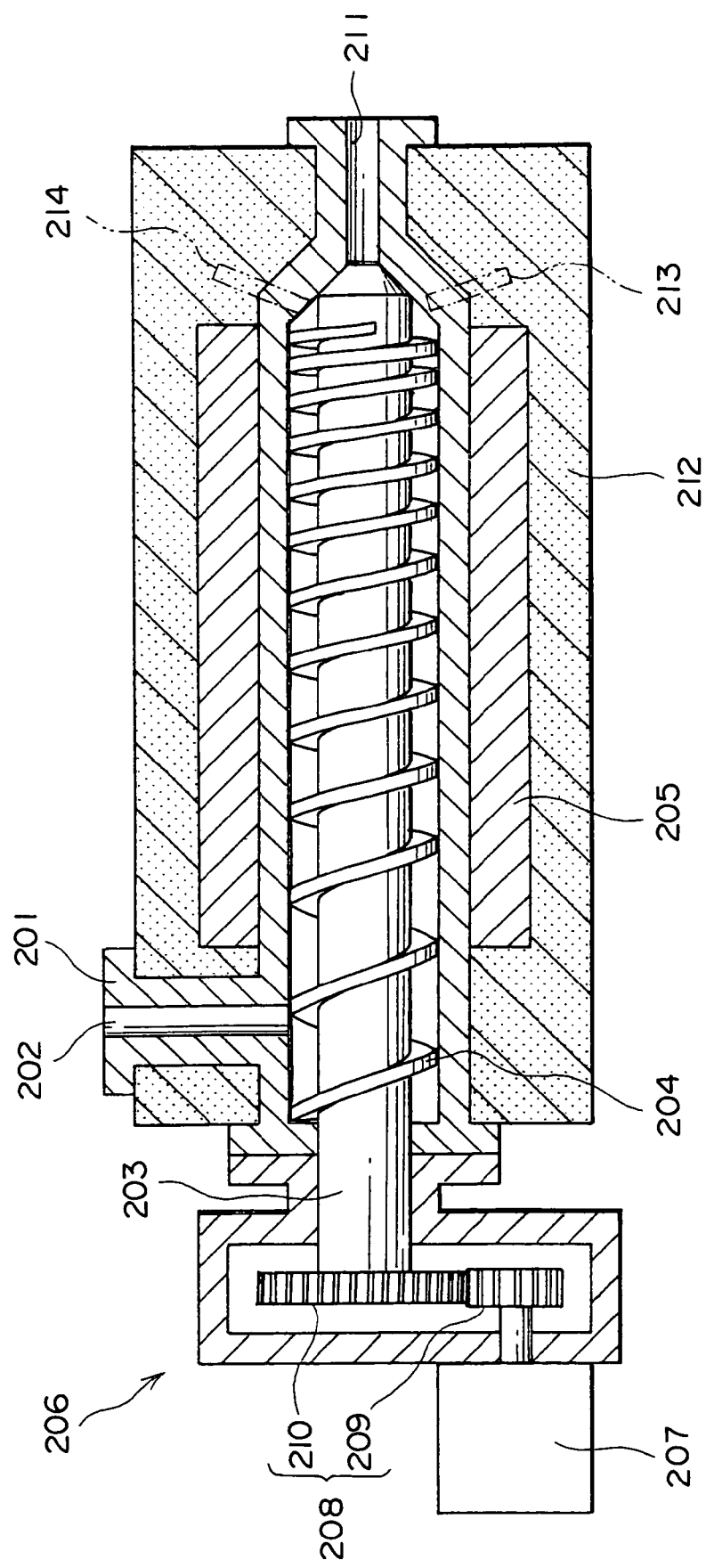
FIG. 13 is a partial sectional view of an extruder having a pressure-sealed cylinder as an example of a pressure vessel for carrying out a steaming treatment according to a third embodiment of the present invention.

The steaming treatment according to the third embodiment is particularly preferably carried out by an extruder having a pressure-sealed cylinder as shown in FIG. 13. FIG. 13 is a partial sectional view of an extruder having a pressure-sealed cylinder, which is an example of a pressure vessel for carrying out the steaming treatment according to the third embodiment. A case in which bagasse is used as the raw material will be described. The extruder is composed of: a cylinder 201 having a material input port 202 at its base; a screw 203 having a spiral flight 204 for kneading (steaming) and extruding toward its distal end bagasse and water (which may hereinafter be referred to simply as the "materials"), which have been inputted through the material input port 202; a heater 205 for heating the cylinder 201; drive means 206 including a motor 207 connected to a power source (not shown) for rotating the screw 203 and a reduction gear 208 having a prime gear 209 and a driven gear 210; a discharging port 211 for discharging a steamed and extruded product; a heat insulating material 212 covering the cylinder 201 and the heater 205, and the like. A pump (not shown) is connected with the material input port 202 for feeding the materials into the cylinder 201 through the material input port 202. A pitch of the spiral flight 204 of the screw 203 shortens as the spiral flight 204 approaches the discharging port 211. Moreover, the cylinder 201 has a temperature sensor 213 and a pressure sensor 214 installed near the distal end of the screw 203.

The steaming treatment is carried out by the extruder, which is shown in FIG. 13, in accordance with the following sequence. The materials are inputted by the unillustrated pump into the cylinder 201 through its material input port 202, and the internal temperature of the cylinder 201 is regulated to a target temperature by the heater 205. As viewed from the motor 207, a rotary shaft of the motor 207 is rotated clockwise to rotate the primer gear 209 clockwise, the driven gear 210 counterclockwise and the screw 203 counterclockwise, thus boiling the bagasse while extruding the bagasse toward the discharging port 211. Since the pitch of the spiral flight 204 of the screw 203 shortens toward the discharging port 211, the bagasse is compressed and subjected to a specific pressure as it approaches the discharging port 211. The bagasse, for which the steaming treatment has been completed, is extruded through the discharging port 211. Hot water produced by an unillustrated hot water supply apparatus can be used as the water supplied through the material input port 202.

While, in the present embodiment, the temperature sensor 213 and the pressure sensor 214 are installed in the cylinder 201 near the distal end of the screw 203, it is sufficient for an installation position of the temperature sensor 213 to be further toward distal end side of the screw 203 than a middle portion, with respect to the axial direction, of the cylinder 201. The pressure sensor 214 may be installed in a space that is one fourth of the total length of the screw 203 from the distal end of the screw 203 of the cylinder 201.

When the steaming treatment according to the third embodiment is carried out by the extruder shown in FIG. 13, it is necessary for the temperature and pressure determined by the temperature sensor 213 and the pressure sensor 214 to fall within the ranges of 150 to 350° C. and 15 to 29 MPa, respectively.

Moreover, it is also suitable to employ a process in which two or more units of extruder shown in FIG. 13 are connected in a series for steaming treatment, i.e. a process in which a mixture of bagasse or the like and water steamed in a first extruder and extruded through a discharging port 211 thereof is directly inputted into the material input port 202 of a second extruder for further steaming. In the present invention in which bagasse or the like is used, the steaming treatment can be suitably carried out when two units of extruder are connected in a series.

When two or more units of extruder shown in FIG. 13 are connected in a series for the steaming treatment according to the third embodiment, the steaming conditions in the extruders may be the same or differ from one another as long as the steaming conditions for the last connected extruder satisfy the conditions of the temperature of 150 to 350° C. and the pressure of 15 to 29 MPa. In the case in which the steaming conditions differ from one extruder to another, it is preferable for the temperature and pressure to rise from the first extruder to the last connected extruder.

The steaming treatment of the bagasse or the like as described above obtains a mixture of polyphenol (formed by a change from the lignin) and cellulose which are formed by the decomposition of lignocellulose, and soluble hemicellulose (hereinafter referred to as "soluble xylan"). Cellulose (pulp of high quality) can be obtained as a solid by the filtration (filtration treatment) of the mixture.

The cellulose obtained by separating lignin with the filtration treatment is crystallized due to the formation of hydrogen bonds by the hydroxyl groups and is insoluble in both water and any solvent. Therefore, a dehydrating and acetylating treatment is carried out as described below for converting a portion of hydroxyl groups in the molecule to acetate groups to obtain plasticized cellulose acetate, which is soluble in both water and a solvent.

The dehydrating and acetylating treatment is intended for reacting cellulose with acetic anhydride and sulfuric acid in a pressure vessel equipped with a stirrer to substitute acetate groups for the hydroxyl groups, causing the formation of hydrogen bonds in the cellulose, and is expressed by reaction formulae (1) and (2) below when n is the degree of polymerization and m is the degree of substitution.

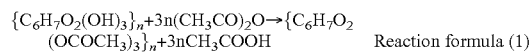

Reaction formula (1)

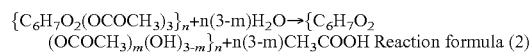

Reaction formula (2)

Reaction formula (1) shows that the reaction of cellulose and acetic anhydride produces cellulose acetate and acetic acid with the complete substitution of acetate groups. On the other hand, reaction formula (2) shows that the reaction of cellulose acetate produced in accordance with reaction formula (1) and water produces cellulose acetate having a degree of substitution m and acetic acid. The acetic acid produced in accordance with reaction formulae (1) and (2) can be reused.

The dehydrating and acetylating treatment can be carried out in accordance with the following sequence.

After the solid (cellulose) obtained by the filtration treatment is washed with water to remove alkali therefrom, sulfuric acid and acetic anhydride are added to and reacted with the obtained solid, acetic acid is removed (collected) from the resulting reaction product by a dehydrator, and is dried. The above procedure obtains cellulose acetate having an acetylation degree of 51 to 61.

The amount of sulfuric acid added is preferably 1 to 10 parts by mass and more preferably 3 to 5 parts by mass relative to 100 parts by mass of dry cellulose. The amount of acetic anhydride added is preferably 1 to 20 parts by mass and more preferably 5 to 10 parts by mass, relative to 100 parts by mass of dry cellulose.

Moreover, acetic acid can be preferably added, and the amount thereof added is preferably 1 to 10 parts by mass and more preferably 3 to 5 parts by mass relative to 100 parts by mass of cellulose.

The dehydration and acetylation treatment is preferably carried out at a pressure of 5 to 15 MPa, and more preferably 8 to 10 MPa. The temperature for the dehydration and acetylation is preferably from 60 to 100° C. and more preferably from 70 to 90° C. The stirring speed for the dehydration and acetylation is preferably from 30 to 100 rpm and more preferably from 40 to 60 rpm. The duration of the dehydration and acetylation is preferably from 15 to 30 hours and more preferably from 20 to 24 hours.

While cellulose acetate is a biodegradable plastic itself, it is also possible to use cellulose acetate as a base and knead various kinds of materials (for example, corn starch and polylactic acid) therein to make biodegradable plastics of different properties.

As described above, the plant component extracting apparatus according to the second embodiment of the present invention can suitably be used in the process for manufacturing cellulose acetate according to the third embodiment.

According to the process for manufacturing cellulose acetate of the third embodiment of the present invention, cellulose acetate useful for producing a biodegradable plastic at a low cost can be manufactured by using bagasse, kenaf, reeds or rice straw as the raw material.

EXAMPLES

The third embodiment of the present invention will now be described more specifically by way of examples, though the present invention is not limited to these examples.

Example 1

The steaming of bagasse was carried out by two serially connected units of pressure-sealed extruder as shown in FIG. 13. The two serially connected extruders included a first extruder with a discharging port 211 thereof connected to a material input port 202 of a second extruder, so that a kneaded mixture steamed in the first extruder could be inputted into the cylinder 201 of the second extruder directly through the material input port 202 thereof.

Five parts by mass of calcium sulfite and 50 parts by mass of water were added to 100 parts by mass of bagasse chips, which were about 5 mm square and formed by crushing bagasse. The mixture was inputted through the material input port 202 into the cylinder 201 of the pressure-sealed extruder as shown in FIG. 13. Then, the temperature and pressure of the first extruder were set to the values stated in Table 1, the motor was driven to rotate the screw 203 and after five minutes of kneading (steaming), a knealed product was extruded through the discharging port 211. The kneaded product extruded through the discharging port 211 was inputted directly into the cylinder 201 of the second extruder through its material input port 202, and kneading (steaming) was carried out. The conditions set and kneading (steaming) time for each extruder are as shown in Table 1. The temperature and pressure stated in Table 1 are the values as determined by the temperature sensor 213 and the pressure sensor 214, respectively. Further, each extruder is structured such that hot water, generated by an unillustrated hot water supply apparatus and having a temperature of 200° C. and a pressure of 15 MPa, is supplied to the extruder at a flow rate of 20 liters/minute.

TABLE 1

|  | First extruder | Second extruder |
| --- | --- | --- |
| Temperature (° C.) | 180 | 195 |
| Pressure (MPa) | 7 | 15 |
| Time for treatment (min) | 7 | 8 |

The bagasse which had been steamed by the two serially connected extruders was cooled by an unillustrated cooling device and filtered by a filtering device. The resulting solid (cellulose) was inputted into a pressure vessel equipped with a stirrer, and after 5 parts by mass of acetic acid, 10 parts by mass of acetic anhydride and 5 parts by mass of sulfuric acid for 100 parts by mass of the solid were further inputted into the pressure vessel, and the mixture was reacted for 24 hours at a pressure of 10 MPa and a stirring speed of 60 rpm to yield cellulose acetate. The solid obtained by the filtration was washed with water having a pressure of 15 MPa and a temperature of 0° C., which water was generated by an unillustrated cold water supply apparatus and supplied to the cooling device at a flow rate of 40 liters/minute. The physical properties of cellulose acetate obtained are shown in Table 2.

TABLE 2

| Raw material | Bagasse |
| --- | --- |
| Outward shape | White flaky powder |
| Specific gravity | 1.32 (25° C.), 1.35 (4° C.) |
| Bulk density (kg/liter) | 0.25-0.5 |
| Glass transition temperature (° C.) | 160-180 |
| Melting point (° C.) | 230-300 |

The steaming treatment of bagasse according to the present invention has made it possible to carry out in a single step the removal of lignin from lignocellulose which has hitherto required many steps, and to acetylate cellulose without conducting any pre-treatment after the removal of lignin therefrom, such as dipping the lignocellulose in acetic acid, to thereby obtain cellulose acetate with a drastic reduction of the steps as hitherto required.

Examples 2 to 4

Cellulose acetate was obtained in the same way as in Example 1 except that the bagasse chips were replaced by kenaf crushed into 5 mm square chips, reeds, and rice straw. The physical properties of cellulose acetate obtained are shown in Table 3 below. The acetylation degree was 51 to 62% and measured four times.

TABLE 3

|  | Example 2 | Example 3 | Example 4 |
|---|---|---|---|
| Raw material | Kenaf | Reeds | Rice straw |
| Outward shape | White powder | White (light yellow) powder | White powder |
| Specific gravity | 1.32 (25° C.), 1.35 (4° C.) | 1.33 (25° C.), 1.36 (4° C.) | 1.32 (25° C.), 1.36 (4° C.) |
| Bulk density (kg/liter) | 0.25-0.5 | 0.25-0.48 | 0.25-0.5 |
| Glass transition temperature (° C.) | 165-180 | 160-180 | 160-180 |
| Melting point (° C.) | 230-285 | 225-290 | 230-300 |

What is claimed is:

1. A process of manufacturing cellulose acetate, the process comprising:

steaming a material selected from one or more of bagasse, kenaf, reeds and rice straw in a pressure vessel in a sub-critical state at a temperature of about 150 to 350° C. and a pressure of about 15 to 29 MPa for about 10 to 30 minutes to obtain a mixture of a solid product and a solution product, wherein the solid product comprises cellulose, wherein the solution product comprises soluble hemicelluloses and polyphenol converted from lignin separated from lignocelluloses, and wherein the sub-critical state is such that the solid product and the solution product are obtained from the material solely due to the temperature and pressure conditions of the state;

filtering the mixture to separate the solid product; and dehydrating and acetylating the solid product in the presence of acetic anhydride and sulfuric acid to obtain cellulose acetate from the solid product.

2. The process of claim 1, wherein the steaming is performed at a temperature of about 150 to 250° C. and a pressure of about 15 to 25 MPa, respectively.

3. The process of claim 1, wherein the steaming is performed at a temperature of about 180 to 200° C. and a pressure of about 25 to 28 MPa, respectively.

4. The process of claim 1, wherein the steaming is performed for about 15 to 20 minutes.

* * * * *